(12) United States Patent
Shi et al.

(10) Patent No.: US 9,149,031 B2
(45) Date of Patent: Oct. 6, 2015

(54) PORTABLE AREA REPELLENT DEVICE

(71) Applicant: S.C. Johnson & Son, Inc., Racine, WI (US)

(72) Inventors: Deliang Shi, Kenosha, WI (US); Nitin Sharma, Kenosha, WI (US); Paul E. Furner, Racine, WI (US); Gerald W. Cummings, Pleasant Prairie, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 161 days.

(21) Appl. No.: 14/025,884

(22) Filed: Sep. 13, 2013

(65) Prior Publication Data

US 2015/0075445 A1    Mar. 19, 2015

(51) Int. Cl.
*B01F 3/04*    (2006.01)
*A01M 29/12*   (2011.01)
*A01M 13/00*   (2006.01)
*A01M 1/20*    (2006.01)

(52) U.S. Cl.
CPC ............. *A01M 29/12* (2013.01); *A01M 1/2033* (2013.01); *A01M 1/2055* (2013.01); *A01M 13/00* (2013.01); *B01F 3/04085* (2013.01)

(58) Field of Classification Search
CPC ............................... B01F 3/04; B01F 3/04085
USPC ................... 261/30, 94, 95, DIG. 88
See application file for complete search history.

(56) References Cited

U.S. PATENT DOCUMENTS

| | | | |
|---|---|---|---|
| 2,585,339 A | 2/1952 | Miller | |
| 2,614,820 A | 10/1952 | Boydjieff | |
| 2,764,789 A | 10/1956 | Zelenka | |
| 3,633,881 A | 1/1972 | Yurdin | |
| 4,059,422 A | 11/1977 | Steiner | |
| 4,111,655 A | 9/1978 | Quincey | |
| 4,166,087 A | 8/1979 | Cline et al. | |
| 4,268,285 A | 5/1981 | Mason | |
| 4,294,778 A | 10/1981 | DeLuca | |
| 4,301,095 A | 11/1981 | Mettler et al. | |
| 4,377,399 A | 3/1983 | Bryson | |
| 4,396,557 A | 8/1983 | DeLuca | |
| 4,830,791 A | 5/1989 | Muderlak et al. | |
| 4,931,224 A | 6/1990 | Holzner, Sr. | |

(Continued)

FOREIGN PATENT DOCUMENTS

| | | |
|---|---|---|
| DE | 102007058847 A1 | 5/2009 |
| WO | 9846280 A2 | 10/1998 |

(Continued)

OTHER PUBLICATIONS

PCT/US2014/055117 International Search Report and Written Opinion dated Dec. 17, 2014.

*Primary Examiner* — Robert A Hopkins

(57) ABSTRACT

A device for dispensing an air treatment chemical includes a housing having an inlet for permitting air to enter into an interior space of the housing and an outlet for permitting air mixed with an air treatment chemical to exit the interior space of the housing. A substrate positioned within the housing bears an air treatment chemical. A power supply mounted within the housing powers a motor within the housing. The motor is connected to a fan mounted within the housing. The fan moves air from the inlet adjacent to the substrate to mix the air treatment chemical into the moving air and deliver the mixture of air and air treatment chemical through the outlet to the outside of the housing.

12 Claims, 19 Drawing Sheets

(56) References Cited

U.S. PATENT DOCUMENTS

| | | |
|---|---|---|
| 5,126,078 A | 6/1992 | Steiner et al. |
| 5,147,582 A | 9/1992 | Holzner, Sr. et al. |
| 5,193,984 A | 3/1993 | Lin |
| 5,234,162 A | 8/1993 | Sullivan |
| 5,305,541 A | 4/1994 | Simpson |
| 5,342,584 A | 8/1994 | Fritz et al. |
| 5,358,443 A | 10/1994 | Mitchell et al. |
| 5,370,829 A | 12/1994 | Kunze |
| 5,431,885 A | 7/1995 | Zlotnik et al. |
| 5,435,817 A | 7/1995 | Davis et al. |
| 5,498,397 A | 3/1996 | Horng |
| 5,547,616 A | 8/1996 | Dancs et al. |
| 5,562,407 A | 10/1996 | Cielo |
| 5,616,172 A | 4/1997 | Tuckerman et al. |
| 5,620,306 A | 4/1997 | Day |
| 5,641,343 A | 6/1997 | Frey |
| 5,695,692 A | 12/1997 | Kennedy |
| 5,735,918 A | 4/1998 | Barradas |
| 5,753,000 A | 5/1998 | Chiu et al. |
| 5,829,188 A | 11/1998 | Tanitomi |
| 5,837,020 A | 11/1998 | Cartellone |
| 5,840,092 A | 11/1998 | Rick et al. |
| 5,925,172 A | 7/1999 | Rick et al. |
| 5,932,147 A | 8/1999 | Chen |
| 6,042,333 A | 3/2000 | Day |
| 6,050,016 A | 4/2000 | Cox |
| 6,050,551 A | 4/2000 | Anderson |
| 6,061,950 A | 5/2000 | Carey et al. |
| 6,102,660 A | 8/2000 | Lee |
| 6,103,201 A | 8/2000 | Green |
| 6,106,786 A | 8/2000 | Akahoshi |
| 6,154,607 A | 11/2000 | Flashinski et al. |
| 6,156,085 A | 12/2000 | Chiu et al. |
| 6,156,088 A | 12/2000 | Cardarelli |
| 6,192,621 B1 | 2/2001 | Fain |
| 6,241,218 B1 | 6/2001 | Tanitomi |
| 6,254,065 B1 | 7/2001 | Ehrensperger et al. |
| 6,293,044 B1 | 9/2001 | Feng |
| 6,315,821 B1 | 11/2001 | Pillion et al. |
| 6,328,791 B1 | 12/2001 | Pillion et al. |
| 6,361,752 B1 | 3/2002 | Demarest et al. |
| 6,371,450 B1 | 4/2002 | Davis et al. |
| 6,391,329 B1 | 5/2002 | Ito et al. |
| 6,392,549 B1 | 5/2002 | Wu |
| 6,435,828 B1 | 8/2002 | Bostwick |
| 6,447,587 B1 | 9/2002 | Pillion et al. |
| 6,482,365 B1 | 11/2002 | Soller |
| 6,497,753 B1 | 12/2002 | Gutmann |
| 6,508,868 B2 | 1/2003 | Pillion et al. |
| 6,511,531 B1 | 1/2003 | Cartellone |
| 6,514,052 B2 | 2/2003 | Bostwick |
| 6,553,711 B1 | 4/2003 | Feng |
| 6,569,387 B1 | 5/2003 | Furner et al. |
| 6,592,104 B2 | 7/2003 | Cox |
| 6,610,254 B1 | 8/2003 | Furner et al. |
| 6,623,265 B1 | 9/2003 | Day |
| 6,631,888 B1 | 10/2003 | Prueter |
| 6,632,405 B2 | 10/2003 | Lua |
| 6,719,217 B1 | 4/2004 | Tawara et al. |
| 6,769,631 B2 | 8/2004 | Brown |
| 6,783,081 B2 | 8/2004 | Pedrotti et al. |
| 6,783,117 B2 | 8/2004 | Wohrle |
| 6,857,214 B1 | 2/2005 | Pelissier |
| 6,859,615 B2 | 2/2005 | Yip et al. |
| 6,881,382 B2 | 4/2005 | Goldstein et al. |
| 6,899,931 B2 | 5/2005 | Porchia et al. |
| 6,909,840 B2 | 6/2005 | Harwig et al. |
| 6,913,733 B2 | 7/2005 | Hardy et al. |
| 6,926,902 B2 | 8/2005 | Inoue et al. |
| 6,950,607 B2 | 9/2005 | Yip et al. |
| 6,966,665 B2 | 11/2005 | Limburg et al. |
| 7,007,861 B2 | 3/2006 | Ketcha et al. |
| 7,008,180 B2 | 3/2006 | Fujimori et al. |
| 7,011,795 B2 | 3/2006 | Thompson et al. |
| 7,040,548 B2 | 5/2006 | Rodgers |
| 7,112,232 B2 | 9/2006 | Chang et al. |
| 7,132,084 B1 | 11/2006 | Roumpos |
| 7,138,130 B2 | 11/2006 | Davis et al. |
| 7,152,809 B2 | 12/2006 | Ketcha et al. |
| 7,167,641 B2 | 1/2007 | Tam et al. |
| 7,168,630 B1 | 1/2007 | Ketcha et al. |
| 7,175,815 B2 | 2/2007 | Yamasaki et al. |
| 7,188,783 B2 | 3/2007 | Ivey et al. |
| 7,204,870 B2 | 4/2007 | Zobele et al. |
| 7,285,248 B2 | 10/2007 | Yamamoto et al. |
| 7,316,729 B2 | 1/2008 | Paterson et al. |
| 7,341,698 B2 | 3/2008 | Pedrotti et al. |
| 7,344,123 B2 | 3/2008 | Pankhurst et al. |
| 7,431,901 B2 | 10/2008 | Stiros et al. |
| 7,459,168 B2 | 12/2008 | Inoue et al. |
| 7,476,002 B2 | 1/2009 | Wolf et al. |
| 7,481,571 B2 | 1/2009 | Bistritzky et al. |
| 7,484,716 B2 | 2/2009 | Ford Morie et al. |
| 7,484,860 B2 | 2/2009 | Demarest et al. |
| 7,503,675 B2 | 3/2009 | Demarest et al. |
| 7,585,344 B2 | 9/2009 | Paterson et al. |
| 7,597,308 B1 | 10/2009 | Stucki |
| 7,597,857 B2 | 10/2009 | Reece |
| 7,621,511 B2 | 11/2009 | Hayes-Pankhurst et al. |
| 7,641,364 B2 | 1/2010 | Abbondanzio et al. |
| 7,670,035 B2 | 3/2010 | Tsai |
| 7,708,256 B2 | 5/2010 | Pankhurst et al. |
| 7,748,687 B2 | 7/2010 | Pankhurst et al. |
| 7,811,348 B2 | 10/2010 | Paterson et al. |
| 7,833,492 B2 | 11/2010 | Schumacher et al. |
| 7,841,587 B2 | 11/2010 | Pankhurst et al. |
| 7,887,759 B2 | 2/2011 | Triplett |
| 7,887,760 B2 | 2/2011 | Yamamoto et al. |
| 7,892,487 B2 | 2/2011 | Adair et al. |
| 7,917,018 B2 | 3/2011 | Schumacher et al. |
| 7,926,792 B2 | 4/2011 | Pankhurst et al. |
| 7,942,388 B2 | 5/2011 | Suissa et al. |
| 7,959,132 B2 | 6/2011 | Butler et al. |
| 8,025,845 B2 | 9/2011 | Yamasaki et al. |
| 8,048,379 B2 | 11/2011 | Sassoon |
| 8,074,970 B2 | 12/2011 | Pankhurst et al. |
| 8,137,629 B2 | 3/2012 | Faber et al. |
| 8,197,761 B1 | 6/2012 | Miller-Larry |
| 8,282,883 B2 | 10/2012 | Yamasaki et al. |
| 8,303,385 B2 | 11/2012 | Park |
| 8,320,751 B2 | 11/2012 | Porchia et al. |
| 8,328,894 B2 | 12/2012 | Thurin et al. |
| 8,347,549 B2 | 1/2013 | Durand et al. |
| 8,359,785 B2 | 1/2013 | Ohtsuka et al. |
| 8,367,011 B2 * | 2/2013 | Yamamoto ............... 422/306 |
| 8,371,740 B2 | 2/2013 | Pestl et al. |
| 8,385,730 B2 | 2/2013 | Bushman et al. |
| 8,435,450 B2 | 5/2013 | Kawamura et al. |
| 8,449,828 B2 | 5/2013 | Yamamoto et al. |
| 2002/0197189 A1 | 12/2002 | Lua |
| 2003/0012680 A1 | 1/2003 | Balsys |
| 2004/0146435 A1 | 7/2004 | Goldstein et al. |
| 2004/0180070 A1 | 9/2004 | Inoue et al. |
| 2005/0019165 A1 | 1/2005 | Fujimori et al. |
| 2005/0191217 A1 | 9/2005 | Selander |
| 2005/0214175 A1 | 9/2005 | Barker |
| 2005/0220664 A1 | 10/2005 | Hitzler et al. |
| 2005/0226788 A1 | 10/2005 | Hrybyk et al. |
| 2005/0255008 A1 | 11/2005 | Lin |
| 2006/0039835 A1 | 2/2006 | Nottingham et al. |
| 2006/0043619 A1 | 3/2006 | Brown et al. |
| 2006/0137241 A1 | 6/2006 | Yamasaki et al. |
| 2007/0001024 A1 | 1/2007 | Wold et al. |
| 2007/0036673 A1 | 2/2007 | Selander |
| 2007/0087679 A1 | 4/2007 | Yamasaki et al. |
| 2007/0111654 A1 | 5/2007 | Yamasaki et al. |
| 2007/0158456 A1 | 7/2007 | Spector |
| 2007/0180801 A1 | 8/2007 | Paterson et al. |
| 2007/0180996 A1 | 8/2007 | Paterson et al. |
| 2008/0130266 A1 | 6/2008 | DeWitt et al. |
| 2008/0244954 A1 | 10/2008 | Shannon |
| 2008/0271338 A1 | 11/2008 | Muir et al. |
| 2008/0299014 A1 | 12/2008 | Kim |
| 2009/0008411 A1 | 1/2009 | Schumacher et al. |

(56) References Cited

U.S. PATENT DOCUMENTS

| | | |
|---|---|---|
| 2009/0060799 A1 | 3/2009 | Torres |
| 2009/0072783 A1 | 3/2009 | Gaspar et al. |
| 2009/0183636 A1 | 7/2009 | Levine et al. |
| 2009/0200393 A1 | 8/2009 | Avelar |
| 2009/0218415 A1 | 9/2009 | Faires et al. |
| 2010/0025490 A1 | 2/2010 | Bushman et al. |
| 2010/0038443 A1 | 2/2010 | Pankhurst et al. |
| 2010/0044468 A1 | 2/2010 | Granger et al. |
| 2010/0064895 A1 | 3/2010 | Thurin et al. |
| 2010/0090022 A1 | 4/2010 | Hayashida |
| 2010/0129268 A1 | 5/2010 | Andersen |
| 2010/0132246 A1 | 6/2010 | Ohtsuka et al. |
| 2010/0150774 A1 | 6/2010 | Marchetti et al. |
| 2010/0177597 A1 | 7/2010 | Tsai |
| 2010/0180830 A1 | 7/2010 | Fritter et al. |
| 2010/0269826 A1 | 10/2010 | Colombo et al. |
| 2010/0284783 A1 | 11/2010 | Lolmede |
| 2010/0288847 A1 | 11/2010 | Gruenbacher et al. |
| 2011/0027124 A1 | 2/2011 | Albee et al. |
| 2011/0038761 A1 | 2/2011 | Saleh et al. |
| 2011/0049259 A1 | 3/2011 | Beland et al. |
| 2011/0108633 A1 | 5/2011 | Yamamoto et al. |
| 2011/0108634 A1 | 5/2011 | Yamamoto et al. |
| 2011/0110827 A1 | 5/2011 | Yamamoto et al. |
| 2011/0116977 A1 | 5/2011 | Yamamoto et al. |
| 2011/0134628 A1 | 6/2011 | Pestl et al. |
| 2011/0221079 A1 | 9/2011 | Yamasaki et al. |
| 2011/0268605 A1 | 11/2011 | Haran |
| 2012/0180666 A1 | 7/2012 | Lim et al. |
| 2012/0181350 A1 | 7/2012 | Snider |
| 2012/0183280 A1 | 7/2012 | Kowalec et al. |
| 2012/0205460 A1 | 8/2012 | Franks |
| 2012/0248136 A1 | 10/2012 | Meyers |
| 2012/0261484 A2 | 10/2012 | Blaylock et al. |
| 2012/0273978 A1 | 11/2012 | Sharma |
| 2012/0275932 A1 | 11/2012 | Sharma |
| 2012/0288414 A1 | 11/2012 | Shi et al. |
| 2013/0049236 A1 | 2/2013 | Garon et al. |

FOREIGN PATENT DOCUMENTS

| | | |
|---|---|---|
| WO | 9902032 A1 | 1/1999 |
| WO | 0165931 A1 | 9/2001 |
| WO | 02060246 A1 | 8/2002 |
| WO | 03103387 A2 | 12/2003 |
| WO | 2005063013 A1 | 7/2005 |
| WO | 2006052519 A2 | 5/2006 |
| WO | 2006084317 A1 | 8/2006 |
| WO | 2007017742 A1 | 2/2007 |
| WO | 2008112545 A1 | 9/2008 |
| WO | 2009065629 A1 | 5/2009 |
| WO | 2009092135 A1 | 7/2009 |
| WO | 2009111903 A1 | 9/2009 |
| WO | 2009147330 A1 | 12/2009 |
| WO | 2011019404 A2 | 2/2011 |
| WO | 2011106889 A1 | 9/2011 |
| WO | 2011126208 A2 | 10/2011 |
| WO | 2012131232 A1 | 10/2012 |
| WO | 2013032920 A1 | 3/2013 |

* cited by examiner

US 9,149,031 B2

PORTABLE AREA REPELLENT DEVICE

CROSS REFERENCE TO RELATED APPLICATIONS

Not applicable

REFERENCE REGARDING FEDERALLY SPONSORED RESEARCH OR DEVELOPMENT

Not applicable

BACKGROUND OF THE INVENTION

1. Field of the Invention

The present invention relates to portable devices that dispense chemicals such as insect repellents and/or fragrances.

2. Description of the Background

Various techniques have been developed to provide humans with protection from insect bites. For insect control inside buildings a primary emphasis is placed on trying to keep insects from entering the building at all (e.g. placing screens over windows). This sometimes is supplemented with chemical treatment of room air and/or the use of traps. See e.g. U.S. Pat. Nos. 6,582,714 and 7,175,815, and also U.S. patent application publications 2005/0079113, 2006/0039835, 2006/0137241 and 2007/0036688.

When an individual is outdoors where the area cannot be effectively screened, and the individual is mostly staying in a particular area (e.g. at a picnic, or on a patio near a building), traps and repellents are the primary focus. For instance, the individual can apply an insect repellent to clothing or directly to their skin. However, some individuals may be averse to applying chemicals onto delicate clothing or directly onto the skin. Such individuals may avoid products which direct that type of application. Further, if an individual removes an outer layer of clothing sprayed with the insect repellent, that individual must reapply or else have a higher risk of insect bites.

Another means for providing protection to humans from insect bites is to infuse a general area with insect repellant by use of candles (e.g. citronella candles) or other dispensing devices which disperse repellents into the air. These dispensing devices may be electrical devices that actively distribute the repellent by use of fans for evaporating an insecticide source, automatic sprays of liquid repellent, heating elements with wicks, and the like. The devices may be mounted to a surface, such as a wall or a table top, or rested thereon. A common electrical dispenser for distributing insect repellent includes an insecticide source housed within the dispenser that further provides a fan to blow air past the insecticide source and dispense the material into the air. The insecticide source is often a substrate impregnated with insect repellent or other air treatment chemicals and can accommodate a flow of air through the substrate when used in conjunction with a fan.

However, present electrical devices have drawbacks of limited coverage area. For instance, devices that cannot distribute the active far enough have dramatically reduced protective capabilities to individuals located outside the periphery of the coverage area. In some cases, coverage area is limited due to constraints on electrical power availability, fan size, and motor power requirements that are necessarily in place for meeting certain design factors, such as those required for achieving lightweight, portable dispensers. Attempts to increase the repellent coverage area include increasing the fan speed and/or providing more power to the motor. However, such modifications often lead to increased fan noise that may be a nuisance in the environment and higher power consumption which may be costly and demand more frequent battery replacements. Other attempts include increasing the size of the electrical dispensers and/or utilizing multiple dispensers. However, such solutions may result in bulky and burdensome devices that are not easily portable.

Hence, a need exists for improved devices for dispensing insect control actives and other air treatment chemicals, particularly those that can provide an increased coverage area while maintaining portability and ease of use.

SUMMARY OF THE INVENTION

In one embodiment the invention provides a portable area repellent device for dispensing an air treatment chemical, where the device has: (a) a housing including an inlet for permitting air to enter into an interior space of the housing and including an outlet for permitting air mixed with air treatment chemical to exit the interior space; (b) a substrate positioned within the housing, the substrate bearing an air treatment chemical; (c) a power supply mounted within the housing; (d) a motor mounted within the housing, the motor being powered by the power supply; and (e) a fan mounted within the housing and connect to the motor, the fan being capable of moving air from the inlet adjacent the substrate so as to mix air treatment chemical into the moving air, and then deliver a mixture of air and air treatment chemical through the outlet to outside of the housing.

In one embodiment, the outlet of the housing has a circumferential ring defined by a plurality of apertures spaced apart by a plurality of strips. The plurality of apertures provide a combined aperture area A and the plurality of strips provide a combined strip surface area S, such that a penetration ratio P of the circumferential ring is defined by $P=A/(A+S)$. It is contemplated that the penetration ratio P is about 0.75 or less, 0.50 or less, and/or about 0.25 or less. In another aspect, the surface area of each of the plurality of strips on the circumferential ring is about uniform.

In some embodiments, the device receives a plurality of substrates that are positioned in a side-by-side or a stacked configuration within the housing. Each of the plurality of substrates bears an air treatment chemical. In a particular embodiment, two or three substrates are positioned within the housing with each of the two or three substrates bearing an air treatment chemical.

In other aspects, the outlet is provided below the inlet on the housing. The fan is configured to divert the air mixture in a radial direction through the interior space of the housing and through the outlet to the outside of the housing. Particularly, it is contemplated that the fan includes a plurality of flat blades sloped opposite to the direction of rotation of the fan. The inlet of the housing comprises at least one inlet aperture that defines a plane transverse to an axis of rotation of the fan. Further, the housing includes a removable housing cover comprising the inlet and a housing body defined by a housing wall that extends upward from a base of the housing body. The housing wall comprises the outlet and the removable housing cover secures to the housing body with a twist-lock interaction.

In another embodiment the invention provides a portable area repellent device for dispensing an air treatment chemical, where the device has: (a) a housing including an inlet for permitting air to enter into an interior space of the housing and including an outlet for permitting air mixed with air treatment chemical to exit the interior space; (b) a plurality of substrates positioned within the housing, each of the plurality of substrates bearing an air treatment chemical; (c) a power supply mounted within the housing; (d) a motor mounted within the housing, the motor being powered by the power supply; and (e) a fan mounted within the housing and connect to the motor, the fan being capable of moving air from the inlet adjacent the substrate so as to mix air treatment chemical into the moving air, and then deliver a mixture of air and air treatment chemical through the outlet to outside of the housing.

Preferred forms of this device include the fan having a rotor connected to the motor and a plurality of spaced apart flat blades attached to the rotor, wherein the plurality of flat blades are sloped opposite to a direction of rotation of the fan. Further, the outlet of the housing comprises a circumferential ring defined by a plurality of apertures spaced apart by a plurality of strips, such that the circumferential ring is aligned with a plurality of blade tips of the fan. The device is configured to have the plurality of substrates positioned in a side-by-side configuration within the housing or in a stacked configuration within the housing.

In yet another embodiment the invention provides a portable area repellent device for dispensing an air treatment chemical, where the device has: (a) a housing including an inlet for permitting air to enter into an interior space of the housing and including an outlet for permitting air mixed with air treatment chemical to exit the interior space, wherein the housing includes a transitional wall disposed between the inlet and the outlet of the housing, the transitional wall defining an angled flow pathway that flares from a lower end of the transitional wall proximate to the outlet toward an upper end of the transitional wall proximate to the inlet of the housing; (b) a plurality of substrates positioned in the housing, each of the plurality of substrates bearing an air treatment chemical; (c) a power supply mounted within the housing; (d) a motor mounted within the housing, the motor being powered by the power supply; and (e) a fan mounted within the housing and connected to the motor, the fan being capable of moving air from the inlet adjacent the plurality of substrates so as to mix air treatment chemical into the moving air, and then deliver a mixture of air and air treatment chemical through the outlet to outside of the housing.

In preferred forms of this embodiment of the invention, the lower end of the transitional wall secures to a base portion of the housing with a twist-lock interaction and the upper end of the transitional wall receives a housing cover. In another form, a portion of the upper end of the transitional wall is configured to receive a plurality of substrates. The angled flow pathway may define a funnel that provides a converging airflow path between the plurality of substrates to the fan. Further, in yet another form, the transitional wall comprises an outer layer extending to an inner layer, with the outer layer surrounding the inner layer that comprises the angled flow pathway. In one example, the angled flow pathway comprises an inclined surface at about a 30 degree angle to about a 60 degree angle from a plane defined by the circumferential ring. The inclined surface may expand from the lower end of the transitional wall toward the upper end of the transitional wall.

In yet a further example of the present invention, the housing comprises a base portion having a cylindrical wall that provides the outlet and a housing cover having a circular disc that provides the inlet. The housing cover defines a cover diameter greater than a base diameter defined by the cylindrical wall of the base portion. Further, the transitional wall operatively connects the housing cover and the base portion.

These and other advantages of the present invention will become better understood upon consideration of the following detailed description and drawings and claims.

BRIEF DESCRIPTION OF THE DRAWINGS

Like reference numerals will be used to refer to like parts from Figure to Figure in the following description of the drawings.

DETAILED DESCRIPTION OF THE DRAWINGS

Figure 1:
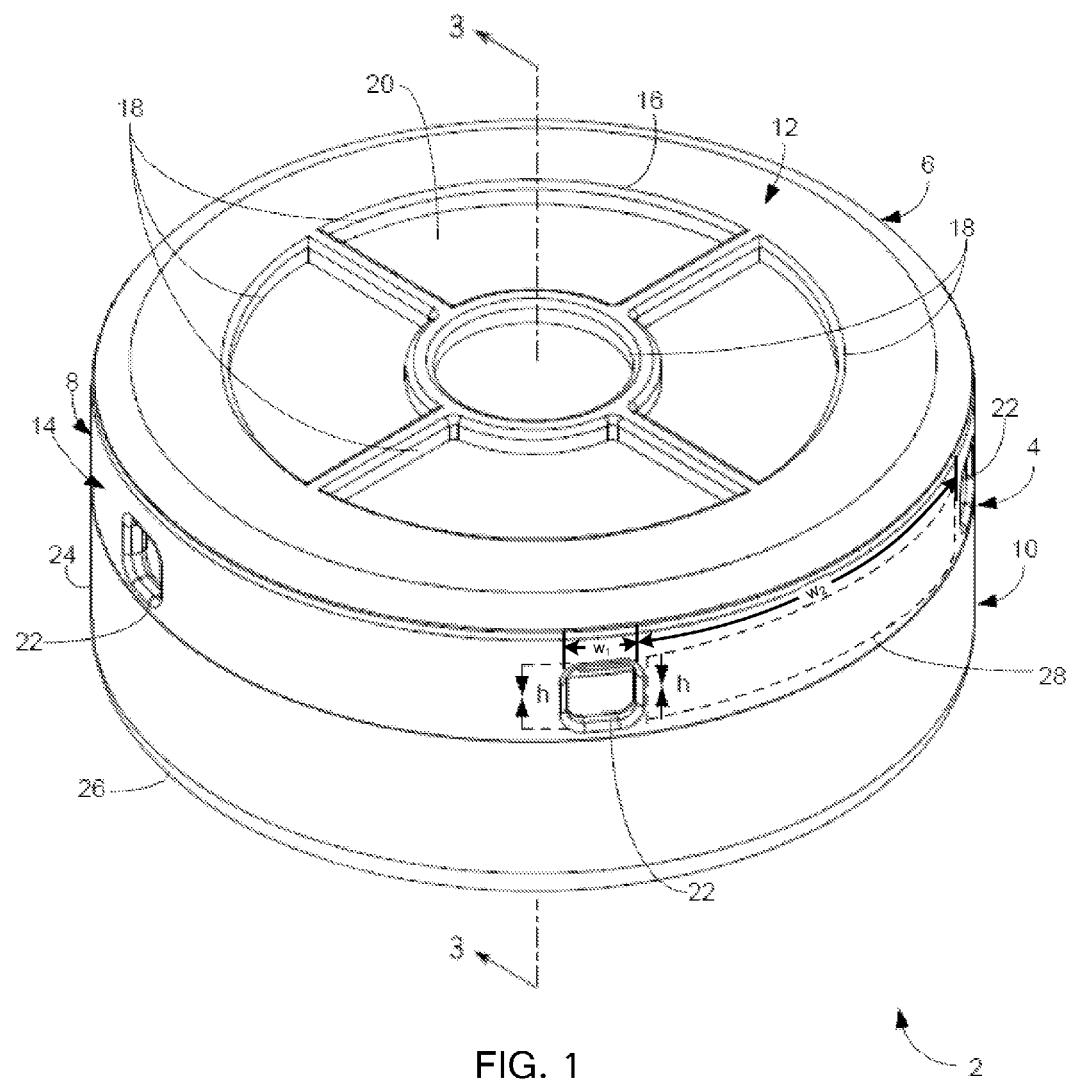
FIG. 1 is a top and side perspective view of a portable area repellent device according to the invention.

FIGS. 1-5 illustrate one embodiment of a portable area repellent device 2. As shown in FIG. 1, the device 2 includes a three-piece housing 4 that comprises a top housing cover 6 disposed on a circumferential ring 8 that is further received on a lower housing body 10. The top housing cover 6 provides an inlet surface 12 for receiving air into the housing 4. The circumferential ring 8 provides an outlet surface 14 for exhausting air out of the housing 4. As shown, the outlet surface 14 is disposed below and generally perpendicular to the inlet surface 12. It is noted, however, that the outlet surface 14 can be disposed at other angles relative to the inlet surface 12, such as acute and obtuse angles taken from within the housing 4 between the outlet surface 14 and the inlet surface 12 disposed above it. Preferably, the angle of the circumferential ring 8 is such that airflow is directed radially upon exit from the housing 4.

In the particular embodiment depicted in FIG. 1, the inlet surface 12 on the top housing cover 6 comprises an inlet grill 16 having a plurality of inlet orifices 18 that expose at least a portion of a chemical substrate 20 disposed within the housing 4. It is contemplated that the top housing cover 6 is removable from the circumferential ring 8 to allow for insertion of the chemical substrate 20 inside the housing 4. The circumferential ring 8 further provides the outlet surface 14 which comprises a plurality of outlet orifices 22 spaced 360 degrees around the ring 8. As shown in FIG. 1, the circumferential ring 8 is received on the lower housing body 8 and transitions smoothly to a cylindrical wall 24 of the lower housing body 8, whereby the cylindrical wall 24 further extends downward to a circular housing base 26. The circular housing base 26 is configured to engage a resting surface, such as a table top. It is worthy to note that numerous variations of the device 2 can be contemplated without compromise to the functionalities disclosed herein. For instance, the device may embody other geometric shapes, the inlet grill 16 of the inlet surface 10 may comprise one or more inlet orifices 18 of various shapes and sizes, a plurality of chemical substrates 20 may be received within the housing 4, and the like.

Still referring to FIG. 1, the circumferential ring 8 is about uniform width and the outlet orifices 22 are about uniform in size and shape. Preferably, the outlet orifices 22 are regularly spaced on the circumferential ring 8 such that a plurality of rectangular strips 28 defined between the outlet orifices 22 are about uniform in size and shape. More preferably, each rectangular strip 28 and outlet orifice 26 are a common height h, and most preferably, the height h is also about the height of the circumferential ring 8. In one aspect, the plurality of outlet orifices 22 together define a combined aperture area A and the plurality of rectangular strips 28 together define a combined strip surface area S. A penetration ratio P of the circumferential ring 8 is defined by $P=A/(A+S)$. It is contemplated that the penetration ratio P is about 0.75 or less, and preferably about 0.50 or less, and more preferably about 0.25 or less.

For instance, and merely by way of example as shown in FIG. 1, the circumferential ring 8 comprises five regularly spaced outlet orifices 22 with each outlet orifice 22 about ¼th the size of each rectangular strip 28. It is approximated that each outlet orifice 22 and each rectangular strip 28 is about height h. As such, the penetration ratio P is $P=\frac{1}{4}x/(\frac{1}{4}x+x)$ or about 0.20. It is contemplated that lower penetration ratios P, preferably around 0.25 or less, and most preferably between about 0.15 to about 0.25, are preferred to achieve a wider air treatment coverage area. In a further method for calculating the penetration ratio P, the width of each of the five outlet orifices 22 is $W_1$ and the width of each of the rectangular strips 28 is $W_2$. As such, the combined aperture area A is defined by $A=h*W_1*$(number of outlet orifices 22) and the combined strip surface area S is defined by $S=h*W_2*$(number of rectangular strips 28). The penetration ratio P is defined by $P=A/(A+S)$, or $P=[h*W_1*$(number of outlet orifices 22)]/$[h*W_1*$(number of outlet orifices 22)$+h*W_2*$(number of rectangular strips 28)$]=W1/(W_1+W_2)$. Notably, computational fluid dynamics ("CFD") simulations show that under the same mass flow rate, a device 2 having less combined aperture area A produces higher velocity of moving air and chemical mixture and thus produces a higher penetration distance. In particular, the CFD simulations show that a device 2 that is approximately 25 percent open, whereby approximately 25 percent of the circumferential ring 8 comprises outlet orifices 22 (i.e., P=0.25), generates airflow that exits the housing 4 at higher velocities than a device 2 that is approximately 100 percent open, whereby approximately 100 percent of the circumferential ring 8 comprises outlet orifices 22 (i.e., P=1.0). More particularly, the magnitude of the velocity vectors simulated for the 25 percent open device reaches speeds of about 3.50 m/s upon exit from the outlet orifices 22, whereas airflow speeds for the 100 percent open device reaches approximately 0.80 m/s upon exit from the outlet orifices.

It is worthy to point that while the outlet orifices 22 shown in FIG. 1 are square-shaped, other geometric shapes for the outlet orifices 22 can be formed, including, merely by way of example, circles, rectangles, stars, diamonds, and the like. Further, it can be contemplated that the outlet orifices 22 can comprise a variety of different shapes or sizes on the single circumferential ring 8. In another aspect, any or all of the above-mentioned components of the three-piece housing 4 can be formed from a suitable polymeric material such as polyethylene, polypropylene, or polyester.

Figure 2:
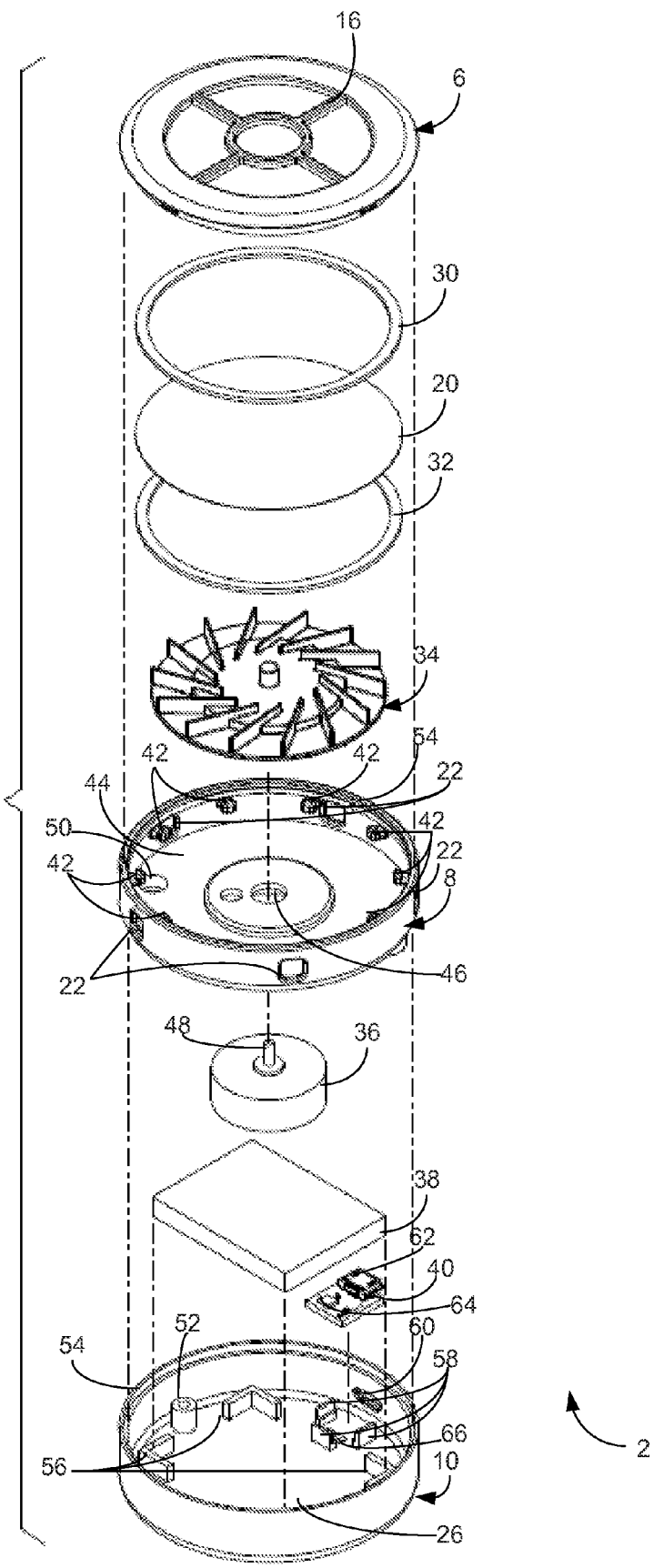
FIG. 2 is an exploded perspective view of the portable area repellent device of FIG. 1.

Turning to FIG. 2, an exploded view of the portable area repellent device 2 of FIG. 1 is depicted. The top housing cover 6 is received on an upper portion of the circumferential ring 8 and acts as a lid for enclosing the chemical substrate 20 disposed between an upper and a lower substrate retention ring 30, 32 and a fan 34 within the circumferential ring 8. The circumferential ring 8 is further received on an upper portion of the lower housing body 10 and acts as a lid for enclosing a motor 36, a power supply unit 38, and a control board 40 within the lower housing body 10. In operation, the power supply unit 38 feeds electrical power to the motor 36 to propel the fan 34, such that air intake from the inlet grill 16 is directed through the chemical substrate 20 that bears an air treatment chemical. The air treatment chemical mixes with the moving air and the air mixture is subsequently diverted in a radial direction out of the outlet orifices 22 by the motor-propelled fan 34.

In particular, the chemical substrate 20 shown in FIG. 2 is a replaceable substance that permits the moving air drawn through the inlet grill 16 to pass through it. The chemical substrate 20 may comprise a fabric, paper, or other fibrous material that is infused with the air treatment chemical, which may include an insecticide, fragrances, solvents, deodorizers and/or a mix thereof. The choice of the fabric material, its porosity, the speed of the moving air flow, and the vapor pressure of the air treatment chemical are some factors that are coordinated in achieving a particular use-up speed of the replaceable chemical substrate 20. An example refill unit has a twelve hour life until its infused air treatment chemical is completely diffused.

The chemical substrate 20 shown in FIG. 2 may comprise one of the fabric substrates described in U.S. Patent Application Publication No. 2011/0038761. For instance, by impregnating the fabric substrate with an appropriate air treatment chemical, air entering the portable area repellent device 2 will pick up some of the volatile air treatment chemical and dispense it out of the device 2. Active release rates of 0.2 milligrams per hour (mg./hr.) or higher are preferred. For use in controlling mosquitoes, preferred actives are pest control active ingredients such as transfluthrin, metofluthrin, prallethrin, vaporthrin, tefluthrin, and esbiothrin or other synthetic pyrethroids. Metofluthrin from the Sumitomo Chemical Company (trade name SumiOne) is particularly preferred. The impregnation material can be pure active, or for ease of handling the material can be dissolved in a hydrocarbon or other solvent. Alternatively, or in addition, the fabric bears a fragrance, a deodorizer, or other air treatment chemical. It is preferred to have the chemical substrate 20 configured so that the pressure drop across the substrate is no more than 40 Pascals (Pa). Suitable fabrics can be made of woven or non-woven materials providing only minimal resistance to the airflow.

The chemical substrate 20 should also be capable of holding active ingredient dosed onto the material and also allow ready migration of the active to the surface so as to allow its evaporation in response to the airflow. For an active ingredient that is hydrophobic and migrateable at common environmental temperatures between about 10° C. and 40° C. (e.g., metofluthrin), suitable materials include, only by way of example, polyester, polypropylene, cotton, cellulose, polyrayon, and other similar fabrics. These can be non-wovens with basis weights ranging from 10 grams per square meter (gsm) to 40 grams per square meter (gsm), fabricated from synthetic, natural, or combined synthetic and natural polymeric materials.

The ideal fabric substrate that forms the chemical substrate 20 should also allow for wicking of the active ingredient following dosing so as to ensure efficient distribution throughout the substrate, and thereafter allow migration of active ingredient to the substrate surface to replenish the active ingredient that is being evaporated by the passing airflow. Dosing may be by dropping, spraying, printing, or other conventional delivery of a liquid active ingredient to the substrate 20. A particularly desirable fabric is a non-woven felted material with a basis weight of 20-30 gsm fabricated from polyethylene terephthalate.

Still referring to FIG. 2, the chemical substrate 20 is secured within the device 2 between the upper substrate retention ring 30 and the lower substrate retention ring 32, which in assembly act as a frame for holding the replaceable substrate 20 above the fan 34. The lower substrate retention ring 32 is mounted on a plurality of protruding elements 42 disposed 360 degrees around an inner surface of the circumferential ring 8. The protruding elements 42 are positioned above the fan 34 and/or beyond the perimeter of the fan 34, such as not to interfere with the operation of the fan 34. Further, each protruding element 42 may form a generally flat resting surface, a groove, and/or a snap-fit for securing the lower substrate retention ring 32. The protruding elements 42 may be formed from the same material as the circumferential ring 8.

One or both of the upper and lower substrate retention rings 30, 32 may be re-used or otherwise provided on each replaceable substrate 20 such that it is disposed upon use-up of the substrate 20. Further, the rings 30, 32 can hold multiple chemical substrates 20 and/or be attached to each other, for instance by a fold line of material providing a hinged segment between the rings 30, 32. The rings 30, 32 may be formed from any material, such as metals or the same material as the three-piece housing 4 as described above, including suitable polymeric material such as polyethylene, polypropylene, or polyester. It is noted that although circular retention rings 30, 32 are provided in FIG. 2, other shapes may be contemplated in light of the variety of shapes that may be embodied by the device 2, as described previously.

Still with reference to FIG. 2, a central platform 44 is provided along a lower end of the circumferential ring 8. The central platform 44 is a solid circular disk that contributes to radial redirecting of the air and chemical treatment mixture by blocking the moving air mixture from entering the lower housing 26. The central platform 44 provides a central opening 46 configured to allow a shaft 48 of the motor 36 from below the platform 44 to extend upward for engagement with the fan 34. The central platform 44 further provides one or more screw holes 50 configured to align with one or more screw sleeves 52 provided on the lower housing body 10. As such, one or more threaded or non-threaded screws (not shown) may be engaged through the screw hole(s) 50 and the screw sleeve(s) 52 to secure the circumferential ring 8 to the lower housing body 10. In an alternative aspect, the circumferential ring 8 may be friction-fitted or simply rested on a protruding ledge 54 of the lower housing body 10. Similarly, the top housing cover 6 may be friction-fitted or rested on an upper end of the circumferential ring 8 to provide easy uncovering and access to the chemical substrate 20. In another example, to prevent inadvertent access to the chemical substrate 20, the top housing cover 6 may twist-turn lock with an upper edge 54 of the circumferential ring 8. In a further example, the top housing cover 6 may include a hinging mechanism to connect with the circumferential ring 8 or other portion of the device 2. The hinging mechanism may include one of the hinge brackets described in U.S. Patent Application Publication No. 2011/0038761. The hinging mechanism allows the top housing cover 6 to be lifted when accessing the chemical substrate 20.

FIG. 2 further shows the lower housing body 10, which provides the at least one screw sleeve 52 described above, a set of power supply unit guides 56, and a set of control board guides 58 on the inner surface of the circular housing base 26. The opposing outer surface of the circular housing base 26 is configured to engage a resting surface, such as a table top. The lower housing body 10 further provides a charging portal 60 which allows passage of an electrical charging cable (not shown) into the device 2 for charging the power supply unit 38. The power supply unit 38 is shown as a rectangular rechargeable battery having four corners that are positioned by the power supply unit guides 56, which may be protruding plastic elements molded together with the base 26. The control board 40 is also rectangular with three sides secured by the set of control board guides 58 which may be formed in similar fashion to the power supply unit guides 56. A fourth side of the rectangular control board 40 is proximate to the charging portal 60, such that a charging receiver 62 disposed along the fourth side aligns with the charging portal 60 and receives the incoming charging cable.

The control board 40 further comprises a microswitch 64 that aligns with a switch opening 66 disposed on the circular housing base 26. The switch opening 66 allows a user to access the microswitch 64 to input a turn on or a shut off command. In another aspect, the control board 40 includes a position sensor (not shown), such as a photosensor, to determine if the device 2 is tipped over, in which case an operational parameter may be implemented by the control board 40, such as automatic shut-off of the device 2. In other aspects, the control board 40 may be programmed to operate the fan 34 at certain time periods throughout the day, different frequencies of operation, various fan speeds, and the like. The power supply unit 38 and/or the control board 40 may be adhered or otherwise affixed to the circular housing base 26. The motor 36 may be positioned against the power supply unit 38 and wired together to establish an electrical power connection for driving motor 36 and propelling the fan 34. The power supply unit 38 and/or motor 36 may further be wired to the control board 40 to receive electrical power and/or other control signals.

Figure 3:
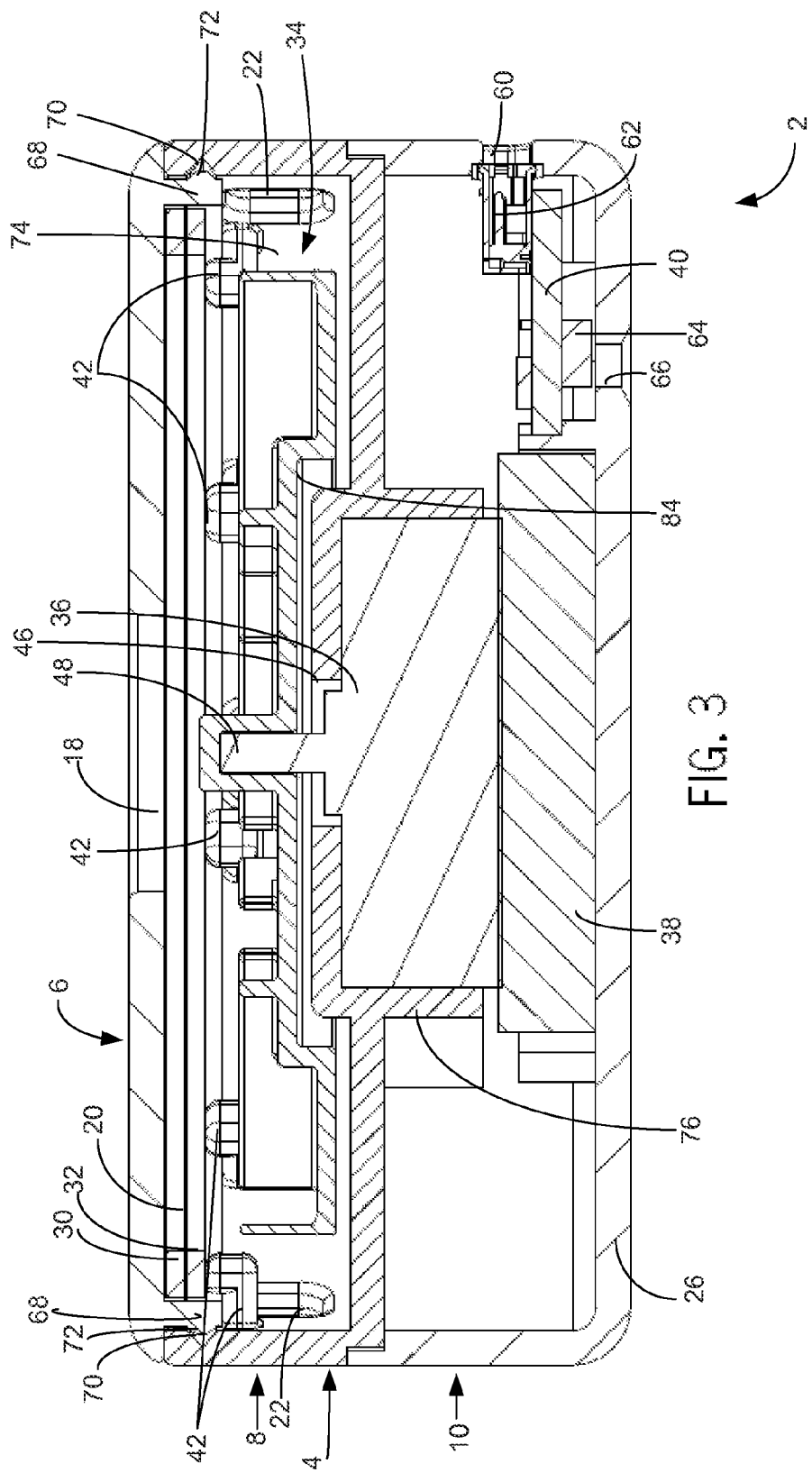
FIG. 3 is a cross-sectional view taken along line 3-3 of FIG. 1.

Referring now to FIG. 3, a cross-section of the device 2 taken along line 3-3 of FIG. 1 is shown. The assembled 3-piece housing 4 includes the top housing cover 6 disposed on the circumferential ring 8, which is further disposed on the lower housing body 10 that extends to the circular housing base 26. In the embodiment as shown, a portion of the top housing cover 6 is inserted within the circumferential ring 8 and a portion of the circumferential ring 8 is inserted with the lower housing base 10. In particular, the top housing cover 6 provides a plurality of snap elements 68 that engage a plurality of grooves 70 provided on the inner surface of the circumferential ring 8. This configuration provides a snap-lock mechanism, whereby a convex surface 72 of each snap element 68 snaps into each groove 70 and causes a temporary deformation of the snap element 68 when removing or attaching the top housing cover 6. It is contemplated that at least one snap element 68 and groove 70 pair is provided. In a preferred embodiment, four snap element 68 and groove 70 pairs are distributed 360 degrees regularly within the device 2. Each snap element 68 further abuts the upper and lower substrate retention rings 30, 32, which are supported in position by the plurality of protruding elements 42 distributed within the circumferential ring 8. At least one chemical substrate 20 is received between the upper and lower substrate retention rings 30, 32, such that the chemical substrate 20 is exposed to the outside of the housing 4 through the plurality of inlet orifices 18 disposed on the top housing cover 6. When air is moved axially into the device 2, the air penetrates the chemical substrate 20 to produce the air and chemical treatment mixture within an interior space of the device 2 defined between the top housing cover 6 and the circumferential ring 8. The air and chemical treatment mixture is redirected radially through the outlet orifices 22 provided on the circumferential ring 8 by the motor-propelled fan 34.

As further shown in FIG. 3, the fan 34 is operatively attached to the motor 36 at the shaft 48 which extends through the central opening 46 of the circumferential ring 8. An underside of the circumferential ring 8 facing the circular housing base 26 provides a motor sleeve 76 which is a downward extending cylindrical wall configured to secure the cylindrical-shaped motor 36 in place. The motor 36 is disposed on top of the power supply unit 38 which lies flush against the circular housing base 26. The control board 40 provides the charging receiver 62 aligned with the charging portal 60 of the lower housing body 10 and provides the microswitch 64 aligned with the switch opening 66 of the circular housing base 26.

Figure 4:
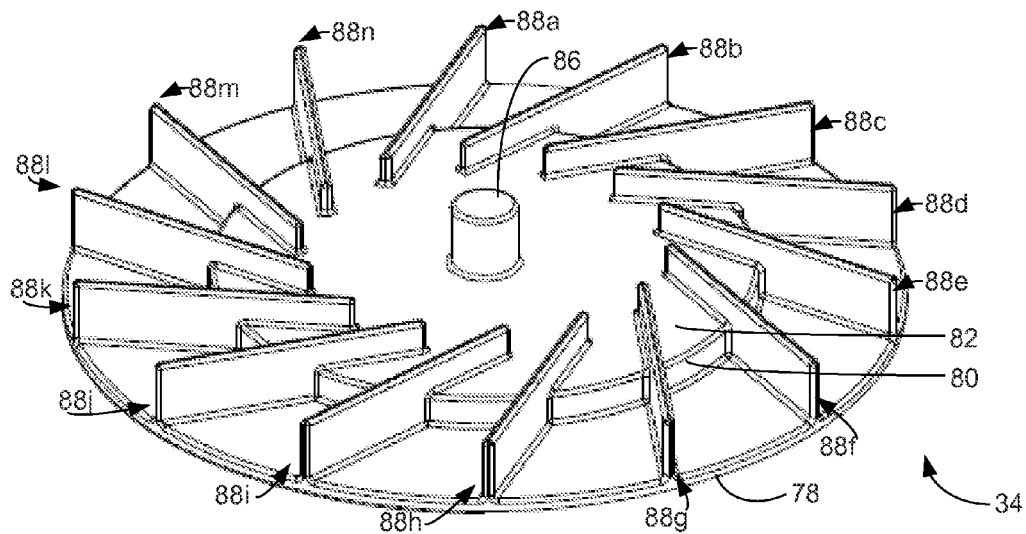
FIG. 4 is a top and side perspective view of a rotor fan of the device of FIG. 1.
Figure 5:
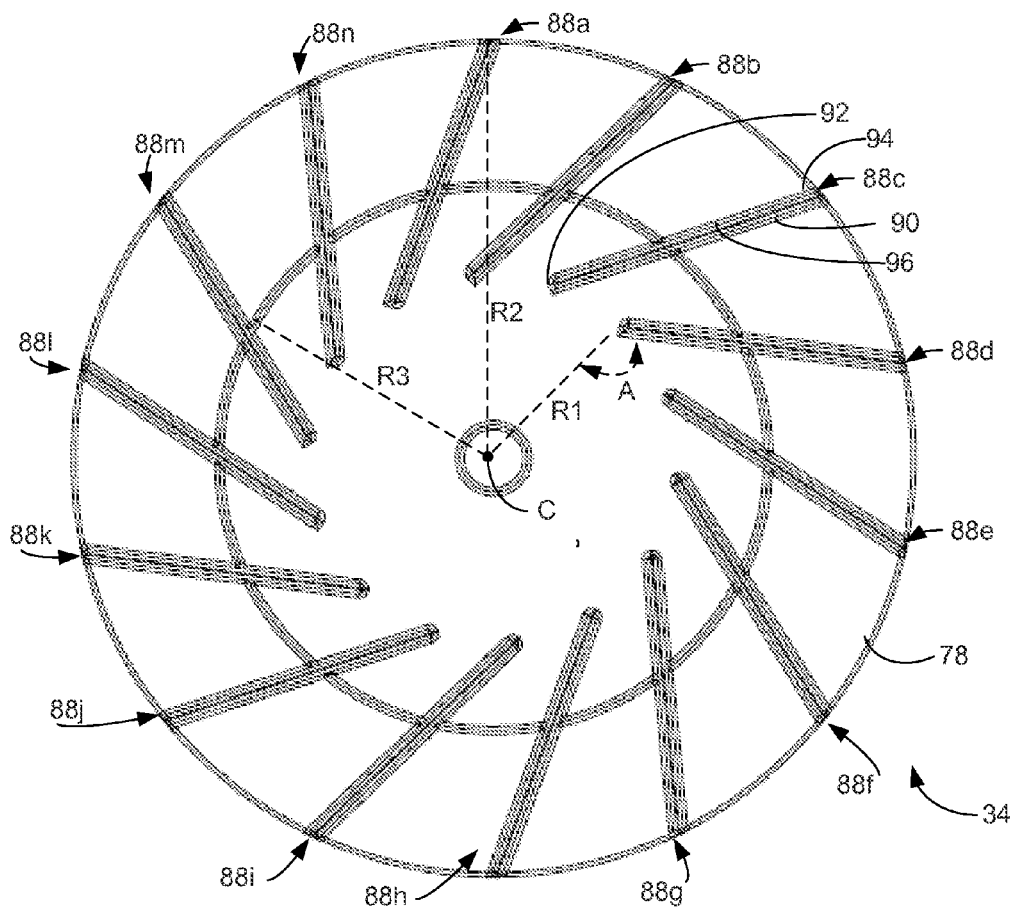
FIG. 5 is a top view of the rotor fan in FIG. 4.

Turning now to FIGS. 4 and 5, a preferred embodiment of the fan 34 is shown. In FIG. 4, the fan 34 has a rotor 78 with a central vertical wall 80 that joins a top horizontal wall 82. The central vertical wall 80 and the top horizontal wall 82 define a recess 84 (see FIG. 3) on the underside of the rotor 78. The top horizontal wall 82 of the rotor 78 includes a tubular mounting element 86 on the axis of the rotor 78 to operatively engage the shaft 48 of the motor 36 as shown in FIG. 3. Further shown in FIG. 4, the preferred fan 34 includes fourteen fan blades 88a to 88n, although more or less fan blades may be provided on the rotor 78. It is contemplated that a fan configuration having twelve to eighteen flat fan blades results in an ideal balance of airflow and minimal power consumption. Further, it is contemplated that the fan 34 will operate at about 3000 rpm to about 5000 rpm. The preferred fan 34 may further include one or more aspects of the fan described in U.S. Patent Application Publication No. 2011/0038761.

FIG. 5 shows that each blade 88a to 88n has a generally rectangular body 90 defined by an inner edge 92, an outer edge 94, and a top edge 96 extending from the inner edge 92 to the outer edge 94. A radial reference line $R_1$ can be extended from a centerpoint C of the rotor 78 to the inner edge 92 of each blade 88a to 88n. Likewise, a radial reference line $R_2$ can be extended from the centerpoint C to the outer edge 94 of each blade 88a to 88n. The rectangular body 90 of each blade 88a to 88n forms an included angle A with its associated radial reference line $R_1$. In the embodiment as shown, each blade 88a to 88n is angled at the angle A in the direction of rotation of the fan 34, which rotates about a vertical axis through the centerpoint C. In other embodiments, the fan blades 88a to 88n are angled in a direction opposite to the direction of rotation of the fan 34. It is contemplated that each blade 88a to 88n has a length extending from the inner edge 92 to the outer edge 94 that measures about 120% to about 180% of the distance of the radial reference line $R_1$, and more preferably about 150% of the distance of the radial reference line $R_1$. Preferably, each blade 88a to 88n has a length extending from the inner edge 92 to the outer edge 94 that measures about 60% to about 90% of the distance of the radial reference line $R_2$, and more preferably about 75% of the distance of the radial reference line $R_2$. In the embodiment shown in which the fan blades 88a to 88n are angled in the direction of rotation of the fan 34, it is contemplated that the included angle A which is formed between the rectangular body 90 of each blade 88a to 88n is in the range of 100 degrees to about 150 degrees. More preferably, the included angle A is in the range of about 120 degrees to about 130 degrees. In another aspect, a radial reference line $R_3$ can be extended from the centerpoint C of the rotor 78 to the central vertical wall 80 with a length that is about 80% to about 130% of the length of the rectangular body 90 of each blade 88a to 88n, and more preferably $R_3$ is about the same length as the rectangular body 90. Such example fan sizes and fan blade angles are intended to contribute to an ideal balance of airflow and minimal power consumption for the portable area repellent device 2, although other fan designs can be contemplated as well.

Figure 6:
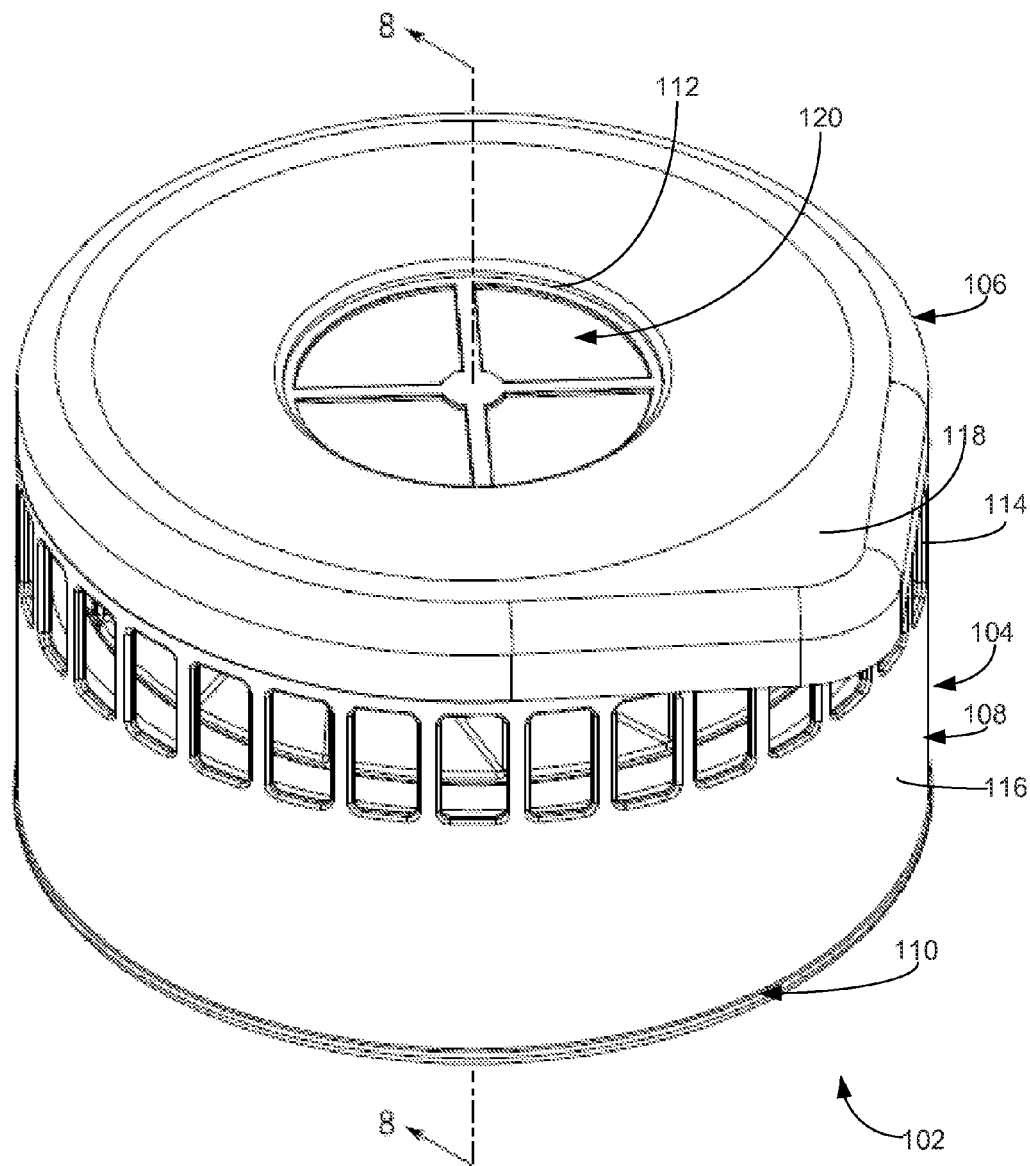
FIG. 6 is a top and side perspective view of a second embodiment of the portable area repellent device according to the invention.
Figure 7:
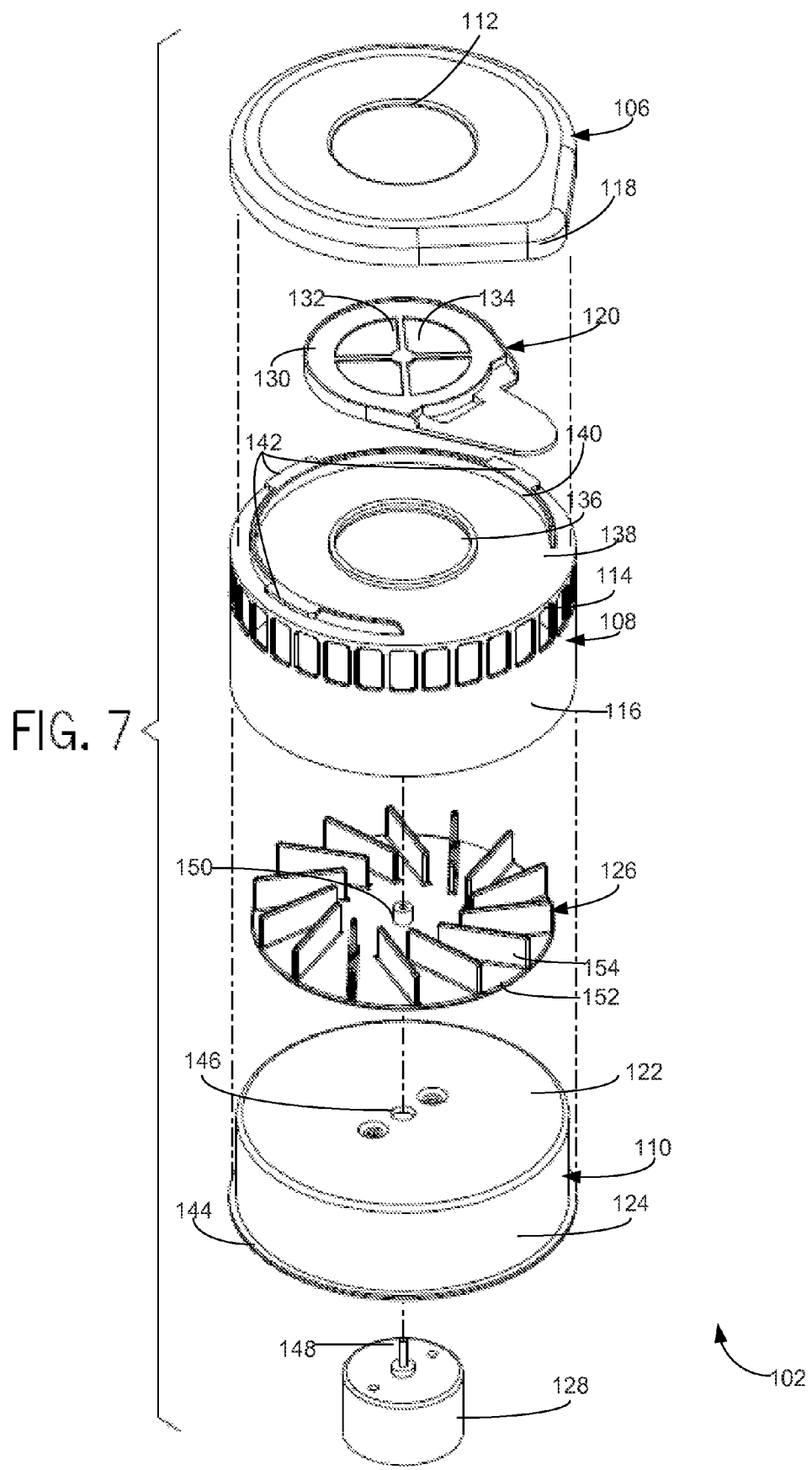
FIG. 7 is an exploded perspective view of the portable area repellent device of FIG. 6.
Figure 8:
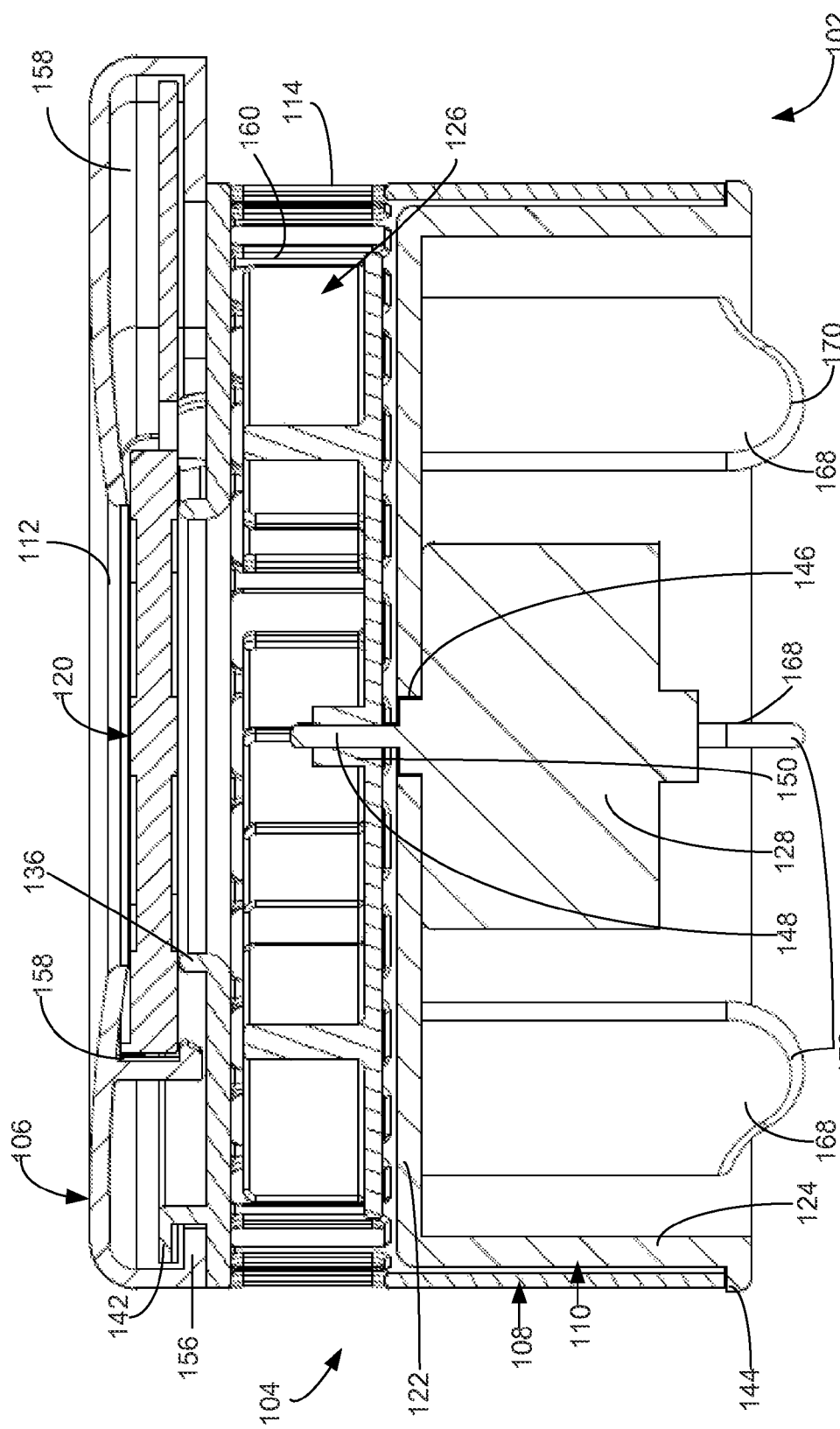
FIG. 8 is a cross-sectional view taken along line 8-8 of FIG. 6.

Moving now to FIGS. 6-8, an alternative embodiment of a portable area repellent device 102 is shown. The alternative device 102 includes a three-piece housing 104 that comprises a top housing cover 106 disposed on a circumferential ring 108 that is further received over a lower housing body 110. The top housing cover 106 provides an inlet orifice 112 for receiving air into the housing 104. The circumferential ring 108 provides a row of outlet orifices 114 for exhausting air out of the housing 104, whereby a plurality of outlet orifices 114 are spaced regularly around 360 degrees of the circumferential ring 108. As shown, the outlet orifices 114 are disposed below and generally transverse to the plane of the inlet orifice 112. Further, a solid cylindrical wall 116 extending below the row of outlet orifices 114 generally conceals the lower housing body 110 disposed within it. In one preferred embodiment, a range of 25 to 35 rectangular-shaped outlet orifices 114 are spaced evenly above the cylindrical wall 116 on the circumferential ring 108. It is noted that other shapes and configurations are possible, including the above-described configuration shown in FIGS. 1-3.

As further shown in FIG. 6, the top housing cover 106 extends to a protruding tab 118 having a generally pointed structure interrupting the otherwise circular profile of the top housing cover 106. The protruding tab 118 may aid in removal of the top housing cover 106 from the circumferential ring 108, which may be secured together according to various methods described in FIGS. 1-3. The protruding tab 118 also receives a portion of a chemical substrate 120 secured within the device 102 and exposed through the inlet orifice 112. It is noted that while the inlet orifice 112 is generally a circular aperture as shown in FIG. 6, other shapes and configurations can be contemplated, such as a plurality of inlet orifices 112 and/or grill structures.

Turning to FIG. 7, an exploded view of the portable area repellent device 102 of FIG. 6 is provided. The top housing cover 106 which provides the inlet orifice 112 and the protruding tab 118 is received on an upper portion of the circumferential ring 108 and acts as a lid for enclosing the chemical substrate 120 disposed therein. The circumferential ring 108, which provides the outlet orifices 114 disposed above the cylindrical wall 116, is further slid over the lower housing body 110 as a covering. The lower housing body 110 comprises a fan support platform 122 extending to a hollow cylindrical shell 124, whereby the fan support platform 122 mounts a fan 126 for radial alignment with the row of outlet orifices 114. A motor 128 is secured inside the cylindrical shell 124 from an underside of the fan support platform 122.

In particular, the chemical substrate 120 shown in FIG. 7 is a replaceable refill substance that bears an air treatment chemical, such as one or more of the actives described previously. The chemical substrate 120 may include one or more aspects of the refill units described in U.S. Patent Application Publication No. 2011/0038761. In the embodiment as shown, the chemical substrate 120 in FIG. 7 has a generally slab-like support structure 130 that is essentially tear-drop shaped with a circular portion at one end and a triangular portion at another end. The triangular portion may be particularly arranged to engage the protruding tab 118 of the top housing cover 106 when assembled. The support structure 130 has a circular opening with a spoke support 132 spanning across it, which may aid in positioning a fabric substrate 134 that bears the air treatment chemical. When air is drawn in through the inlet orifice 112, the air passes through the fabric substrate 134 portion of the chemical substrate 120 and a volume of the air treatment chemical mixes with the moving air. The moving air continues to be drawn through a substrate opening 136 on a substrate support platform 138 provided on the circumferential ring 108.

Looking at the substrate support platform 138 of FIG. 7, the substrate opening 136 is shown as circular and approximately the same size as the circular opening of the support structure 130 on the chemical substrate 120. Further the substrate opening 136 provides a raised lip which may engage a corresponding underside portion of the chemical substrate 120 to secure the substrate 120 onto the circumferential ring 108 in proper axial alignment. Notably, other sizes and shapes may form the substrate opening 136, which may match any of a variety of shapes formed with the construction of the chemical substrate 120. The circumferential ring 108 further provides a twist-lock spine 140 disposed between the substrate opening 136 and the edge of the substrate support platform 138. The twist-lock spine 140 forms a protruding ridge with a plurality of locking tabs 142 that engage corresponding locking notches provided on the underside of the top housing cover 106. In the preferred embodiment shown in FIG. 7, three locking tabs 142 are provided, although any number of locking tabs 142 may be contemplated. When the top housing cover 106 is placed flush against the circumferential ring 108, a brief twist of the cover 106, such as a clockwise quarter-turn, can engage the locking tabs 142 in the cover 106.

FIG. 7 further shows the lower housing body 110 having a circular rim 144 that extends radially around a base of the cylindrical shell 124. In assembly, the circular rim 144 abuts a bottom edge of the circumferential ring 108 and may further utilize various locking mechanisms to secure the ring 108 and rim 144 together. On the upper end of the lower housing body 110, a central opening 146 is provided through the fan support platform 122 for insertion of a shaft 148 of the motor 128 from beneath the platform 122. The shaft 148 operatively engages the fan 126 at a tubular mounting element 150 disposed on a rotor 152 of the fan 126. As shown in FIG. 7, the fan 126 may comprise a plurality of flat rectangular blades 154 that are angled opposite to the direction of rotation of the fan 126. In another aspect, the blades 154 may be angled into the direction of rotation of the fan 126. It is contemplated that the fan 126 may include any of the aspects of the fan 34 that is described in FIGS. 4-5.

Referring now to FIG. 8, a cross-section of the device 102 taken along line 8-8 of FIG. 6 is shown. The assembled 3-piece housing 104 includes the top housing cover 106 disposed on the circumferential ring 108, which is further disposed on the lower housing body 110 that extends to the circular rim 144. As shown, the top housing cover 106 is twist-lock secured to the circumferential ring 108 by engaging the locking tab 142 on the ring 108 with a corresponding locking element 156. The chemical substrate 120 rests on the substrate opening 136 and is further received within one or more slots 158 provided on the underside of the top housing cover 106. In an aspect, the slot 158 or plurality of slots 158 for engaging various portions of the chemical substrate 120, such as the circular portion and the triangular portion, are engaged when the top housing cover 106 is twist-locked onto the circumferential ring 108. When air passes through the inlet orifice 112 of the top housing cover 106 and past the chemical substrate 120, the air mixes with the air treatment chemical and is further delivered through the substrate opening 136 toward the fan 126. The fan 126 is provided within an interior space 160 of the circumferential ring 108, which is radially aligned with the row of outlet orifices 114 on the ring 108. During operation, the fan 126 radially redirects the flow of mixed air out through the outlet orifices 114.

Further shown in FIG. 8, a top surface of the motor 128 abuts the underside of the fan support platform 122. The shaft 148 of the motor extends through the central opening 146 and is further friction-fitted or otherwise secured within the tubular mounting element 150 of the fan 126. One or more supporting legs 168 may be distributed within the cylindrical shell 124 around the motor 128 and configured to engage a resting surface such as a table-top. In a preferred embodiment as shown, six supporting legs 168 are regularly spaced within the cylindrical shell 124, with a vertical side of each supporting leg 168 in connection with the cylindrical 124 and a horizontal top portion of the each supporting leg 168 in contact with the underside of the fan support platform 122. The supporting legs 168 may be constructed of the same material and/or mold as the lower housing body 110, and may further provide textured and/or rubberized grips on a base surface 170 of each leg 168 in order to enhance friction between the device 102 and a resting surface, thereby preventing slippage of the device 102. In another aspect, the lower housing body 110 may be configured to secure a power supply and/or control unit (not shown) for connection to the motor 128. For instance, the power supply may comprise one or more batteries placed adjacent to the underside of the motor 128 with one or more battery contacts that deliver power to the motor 128.

Figure 9:
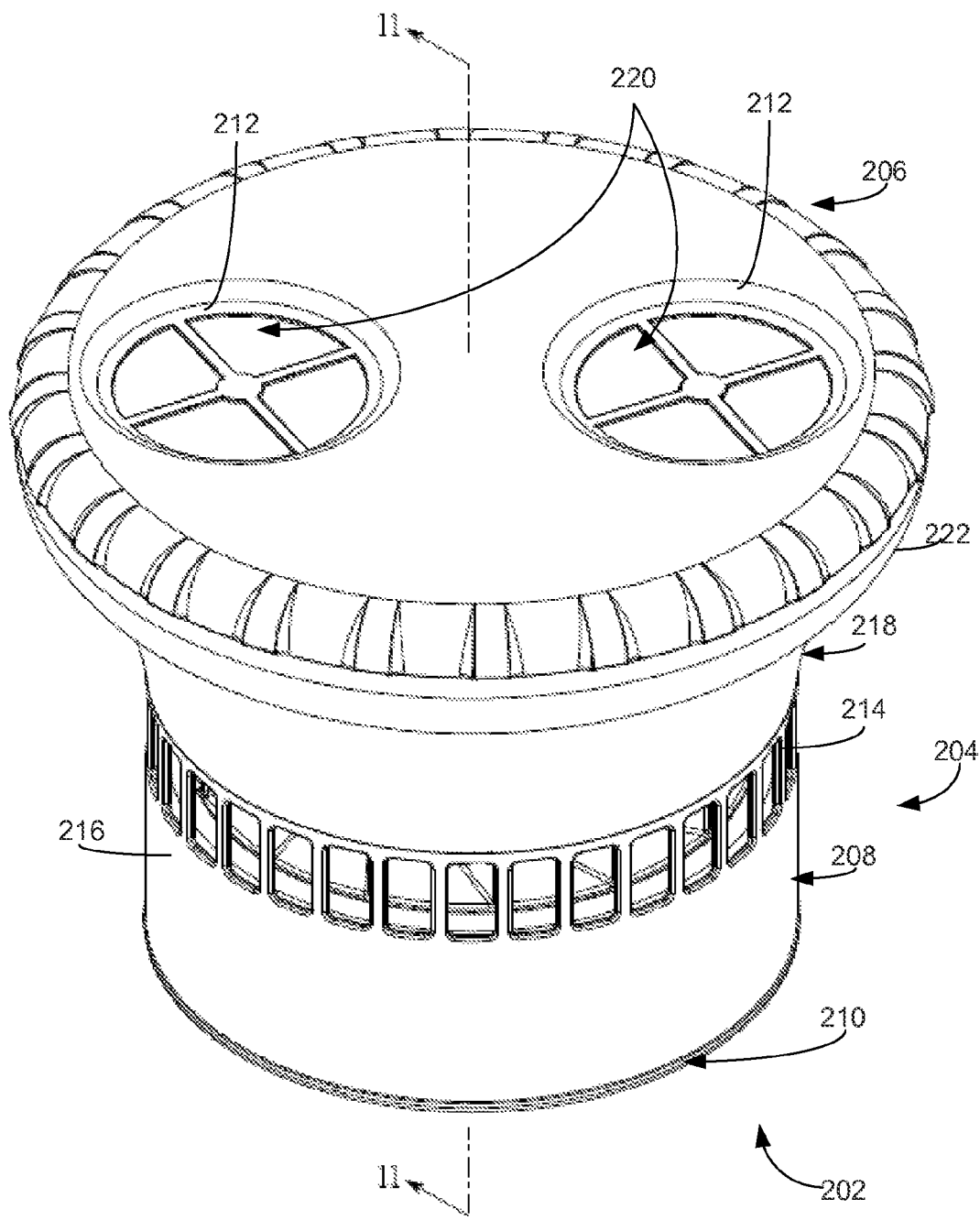
FIG. 9 is a top and side perspective view of a third embodiment of the portable area repellent device having two substrates in a side-by-side configuration according to the invention.

FIGS. 9-12 show yet another embodiment of a portable area repellent device 202. As shown in FIG. 9, the device 202 comprises a four-piece housing 204 having a top housing cover 206 and a circumferential ring 208 disposed over a lower housing body 210. A pair of inlet orifices 212 extends through the top housing cover 206 and a row of outlet orifices 214 is provided immediately above a solid cylindrical wall 216 on the circumferential ring 208. The four-piece housing 204 further comprises a transitional wall 218 that retains a pair of chemical substrates 220 thereon. Together, the top housing cover 206, the circumferential ring 208, the lower housing body 210, and the transitional wall 218 form the four-piece housing 204.

Figure 10:
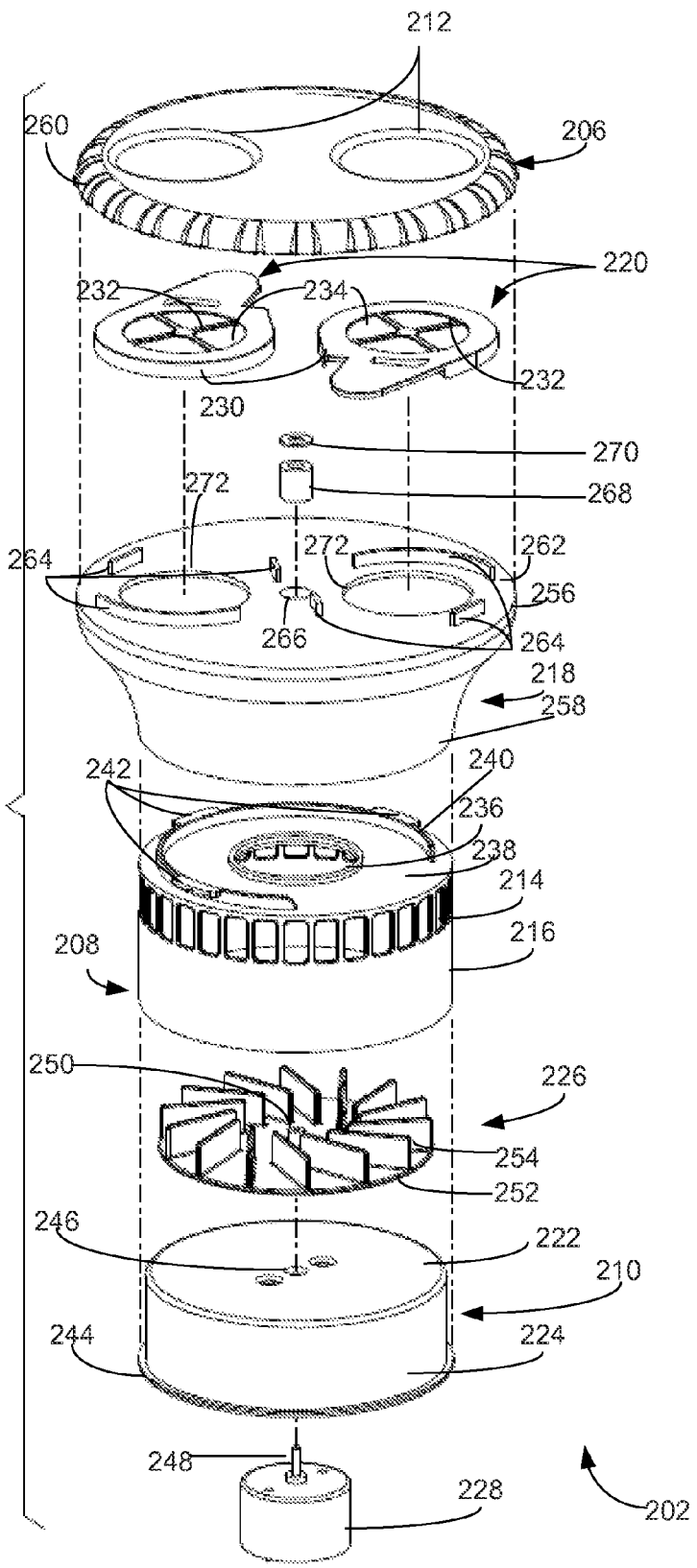
FIG. 10 is an exploded perspective view of the portable area repellent device of FIG. 9.

Turning to FIG. 10, an exploded view of the portable area repellent device 202 of FIG. 9 is provided. The top housing cover 206 which provides the two inlet orifices 212 in a side-by-side configuration is received on an upper portion of the transitional wall 218 and acts as a lid for enclosing the pair of chemical substrate 220 disposed side-by-side therein. The transitional wall 218 is further received on an upper portion of the circumferential ring 208, which provides the outlet orifices 214 disposed above the cylindrical wall 216. The circumferential ring 208 is further slid over the lower housing body 210 as a covering. The lower housing body 210 comprises a fan support platform 222 extending to a hollow cylindrical shell 224, whereby the fan support platform 222 mounts a fan 226 for radial alignment with the row of outlet orifices 214. A motor 228 is secured inside the cylindrical shell 224 from an underside of the fan support platform 222.

Each chemical substrate 220 shown in FIG. 10 is a replaceable refill substance that bears an air treatment chemical. The chemical substrate 220 may include one or more aspects of the chemical substrate 120 described previously. In a particular embodiment, for instance, the chemical substrate 220 has a generally slab-like support structure 230 that is essentially tear-drop shaped with a circular portion at one end and a triangular portion at another end. The support structure 230 has a circular opening with a spoke support 232 spanning across it, which may aid in positioning a fabric substrate 234 that bears the air treatment chemical. When air is drawn in through the pair of inlet orifices 212, the air passes through the fabric substrates 234 portion of the chemical substrate 220 and a volume of the air treatment chemical mixes with the moving air. The moving air continues to be drawn through a substrate opening 236 on a substrate support platform 238 provided on the circumferential ring 208.

Looking at the substrate support platform 238 of FIG. 10, the substrate opening 236 is shown as circular and approximately the same size as the circular opening of the support structure 230 on the chemical substrate 220. Further, the substrate opening 236 provides a raised lip which, in some embodiments such as in FIGS. 6-8, may be configured to engage a corresponding underside portion of an additional chemical substrate 220 to secure such additional substrates 220 onto the circumferential ring 208 in proper axial alignment. Notably, other sizes and shapes may form the substrate opening 236. The circumferential ring 208 further provides a twist-lock spine 240 disposed between the substrate opening 236 and the edge of the substrate support platform 238. The twist-lock spine 240 forms a protruding ridge with a plurality of locking tabs 242 that engage a plurality of corresponding locking notches provided on the underside of the top housing cover 206. In the preferred embodiment shown in FIG. 10, three locking tabs 242 are provided, although any number of locking tabs 242 may be contemplated. When the transitional wall 218 is placed flush against the circumferential ring 208, a brief twist of the transitional wall 218, such as a clockwise quarter-turn, can engage the locking tabs 142 in the wall 218. It is contemplated that the transitional wall 218 and the previously described top housing cover 106 in the FIGS. 6-8 can be interchangeably received by this same twist-lock mechanism.

FIG. 10 further shows the lower housing body 210 having a circular rim 244 that extends radially around a base of the cylindrical shell 224. In assembly, the circular rim 244 abuts a bottom edge of the circumferential ring 208 and may further utilize various locking mechanisms to secure the ring 208 and rim 244 together. On the upper end of the lower housing body 210, a central opening 246 is provided through the fan support platform 222 for insertion of a shaft 248 of the motor 228 from beneath the platform 222. The shaft 148 operatively engages the fan 226 at a tubular mounting element 250 disposed on a rotor 252 of the fan 226. As shown in FIG. 10, the fan 226 may comprise a plurality of flat rectangular blades 254 that are angled opposite to the direction of rotation of the fan 226. In another aspect, the blades 254 may be angled into the direction of rotation of the fan 226. It is contemplated that the fan 226 may include any of the aspects of the fans described herein.

Still referring to FIG. 10, the transitional wall 218 features a flared end 256 on which the pair of chemical substrates 220 are disposed for alignment with the pair of inlet orifices 212 of the top housing cover 206. The top housing cover 206 is received at the flared end 256 of the transitional wall 218, while the circumferential ring 208 is received at a lower end 258 of the wall 218, proximate the outlet orifices 214. Further, a grooved edge 260 spans at least a portion of the edge of the top housing cover 206. The grooved edge 260 provides the user with a gripping surface to allow easy maneuvering of the top housing cover 206, for instance in attaching or removing the cover 206 from the device 202 and in turning the cover to align the inlet orifices 212 with the pair of chemical substrates 220 disposed below it. The chemical substrates 220 are placed on a substrate support platform 262 spanning across the flared end 256 of the transitional wall 218. In particular, a set of substrate frames 264 is provided on the substrate support platform 262 for positioning and securing each chemical substrate 220. The substrate frames 264 may comprise various upstanding physical structures configured to engage edges or underside portions of each chemical substrate 220, such as the circular portion of each substrate as preferred in FIG. 10.

The substrate support platform 262 further provides a pocket 266 disposed centrally on the platform 262 and extending below the platform 262. The pocket 266 is configured to receive a magnet 268 which is provided with a hollow, tubular center for receiving a protruding magnetic element that is disposed on an underside of the top housing cover 206. (see FIG. 11). One or more washers 270 may be provided in axial alignment with the magnet 268. It is contemplated that the magnetic securing mechanism allows for easy maneuvering of the top housing cover 206 while securing it onto the transitional wall 218. However, other securing mechanisms can be contemplated as well, such as a threaded screw disposed on the underside of the top housing cover 206 that may be received in a correspondingly threaded channel, which may be represented by the magnet 268 of FIG. 10. Further disposed on the substrate support platform 262 is a pair of platform orifices 272 that allow the moving air and chemical treatment mixture to flow through the transitional wall 218 and continue through the substrate opening 236 provided on the upper end of the circumferential ring 208, as described in the preceding paragraphs.

Figure 11:
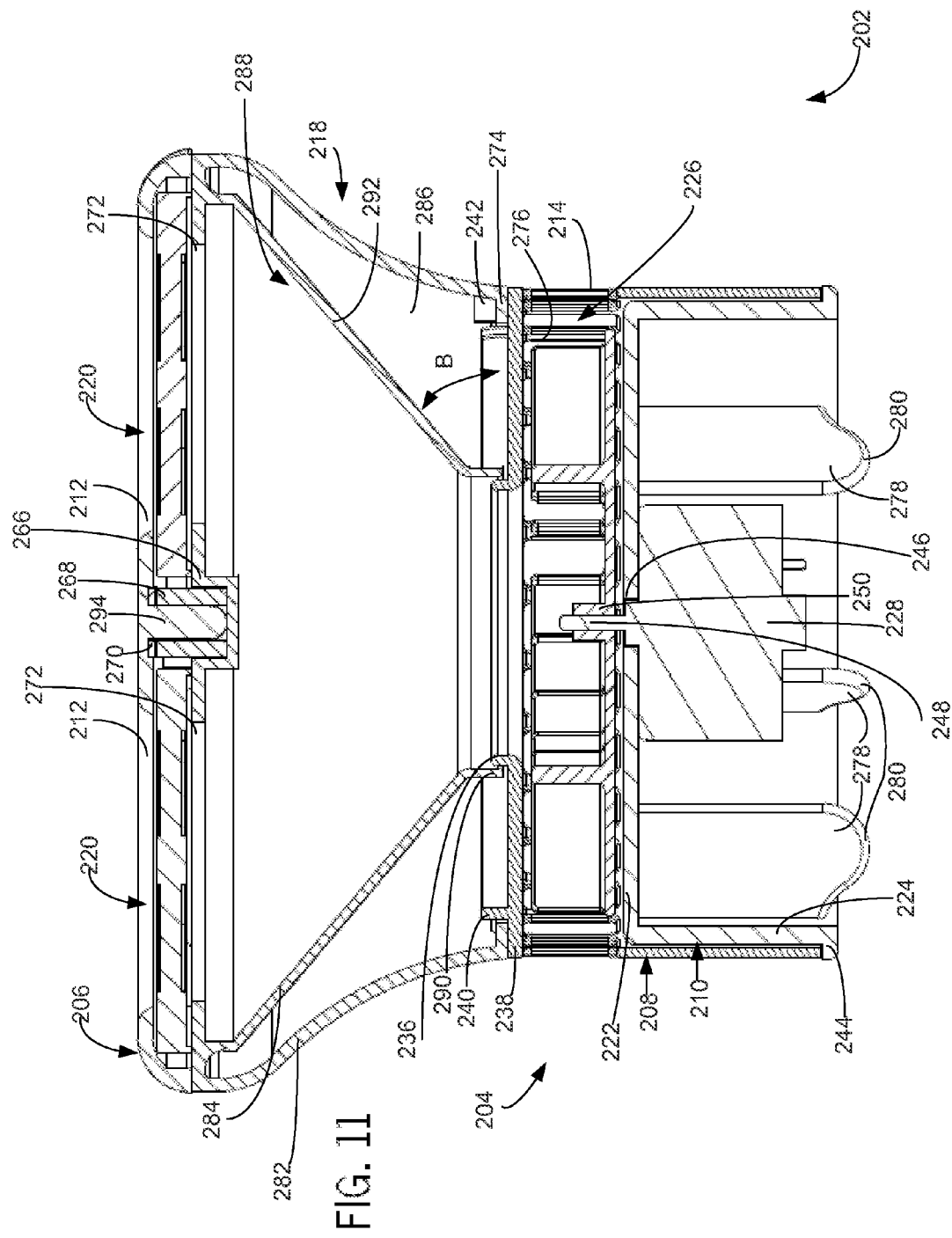
FIG. 11 is a cross-sectional view taken along line 11-11 of FIG. 9.

Referring now to FIG. 11, a cross-section of the device 202 taken along line 11-11 of FIG. 9 is shown. The assembled four-piece housing 204 includes the top housing cover 206 disposed on the transitional wall 218, which is further connected to the circumferential ring 208 that is received over the lower housing body 210. The top housing cover 206 provides two side-by-side inlet orifices 212, while the plurality of outlet orifices 214 are arranged immediately above the cylindrical wall 216 of the circumferential ring 208. Aligned with the two inlet orifices 212 are the two chemical substrates 220 that span across the two platform orifices 272 provided on the transitional wall 218. The transitional wall 218 is twist-lock secured to the circumferential ring 208 by engaging the locking tab 242 on the ring 208 with a corresponding locking element 274 disposed on the wall 218. As shown, the locking element 274 is a horizontally oriented tab extending from the wall 218 to engage an underside portion of the locking tab 242 disposed on the twist-lock spine 240. When air passes through the inlet orifices 212 of the top housing cover 206 and past the pair of chemical substrates 220, the air mixes with the air treatment chemical and is further delivered through the transitional wall 218 toward the substrate opening 236. The mixed air is continued to be drawn through the substrate open 236 by the fan 226. The fan 226 is provided within an interior space 276 of the circumferential ring 208, which is radially aligned with the row of outlet orifices 214 on the ring 208. During operation, the fan 226 radially redirects the flow of mixed air out through the outlet orifices 214.

Further shown in FIG. 11, a top surface of the motor 228 abuts the underside of the fan support platform 222. The shaft 248 of the motor extends through the central opening 246 and is further friction-fitted or otherwise secured within the tubular mounting element 250 of the fan 226. One or more supporting legs 278 may be distributed within the cylindrical shell 224 around the motor 228 and configured to engage a resting surface such as a table-top. In a preferred embodiment as shown, six supporting legs 278 are regularly spaced within the cylindrical shell 224, with a vertical side of each supporting leg 278 in connection with the cylindrical shell 224 and a horizontal top portion of the each supporting leg 278 in contact with the underside of the fan support platform 222. The supporting legs 278 may be constructed of the same material and/or mold as the lower housing body 210, and may further provide textured and/or rubberized grips on a base surface 280 of each leg 278 in order to enhance friction between the device 202 and a resting surface, thereby preventing slippage or other inadvertent motion of the device 202. In another aspect, the lower housing body 210 may be configured to secure a power supply and/or control unit (not shown) for connection to the motor 228. For instance, the power supply may comprise one or more batteries placed adjacent to the underside of the motor 228 with one or more battery contacts that deliver power to the motor 228.

As shown in FIG. 11, the transitional wall 218 is a double-layer wall that comprises an outer layer 282 that extends to an inner layer 284 and defines a cavity 286 therebetween. It is contemplated that the cavity 286 is not subjected to any airflow. Rather, it may be provided to fluidly taper the general shape of the device 202 from the larger diameter of the top housing cover 206 to the smaller diameter defined by the circumferential ring 208. In addition, the outer layer 282 extends to the locking element 274, or plurality thereof, that is configured to twist-lock engage to the circumferential ring 208. The inner layer 284 is angled in the shape of a funnel 288 toward a spout 290 to provide an angled airflow pathway for the air mixture entering through the platform orifices 272 and converging in the spout 290. As shown in FIG. 11, the spout 290 comprises a short cylindrical wall that receives the substrate opening 236 of the circumferential ring 208 such that the air mixture is drawn further into the fan 226. It is contemplated that an airtight or otherwise snug fit between the spout 290 and the substrate opening 236 prevents significant loss of airflow, for instance into the surrounding cavity 286. In a particular aspect, the inner layer 284 defines an inclined surface 292 that is directed at an angle B above a horizontal plane defined by the substrate support platform 238. The angle B is preferred to be about a 30 degree angle to about a 60 degree angle uniformly around the funnel 288. As such, the funnel 288 provides a converging airflow path by defining an angled flow pathway that flares from a lower end of the transitional wall 218 proximate to the outlet toward an upper end of the transitional wall 218 proximate to the inlet of the device 202.

As further shown in FIG. 11, the top housing cover 206 is secured to the transitional wall 218 by the magnetic interaction between a magnetic rod 294 provided on the underside of the cover 206 and the magnet 268 that is provided within the pocket 266 of the transitional wall 218. The washer 270 is disposed between the magnetic rod 294 and the magnet 268, and can be permanently attached to either the rod 294 or the magnet 268. It is contemplated that other portions of the top housing cover 206 can comprise magnetic properties for interaction with corresponding magnetic elements provided on the transitional wall 218.

Figure 12:
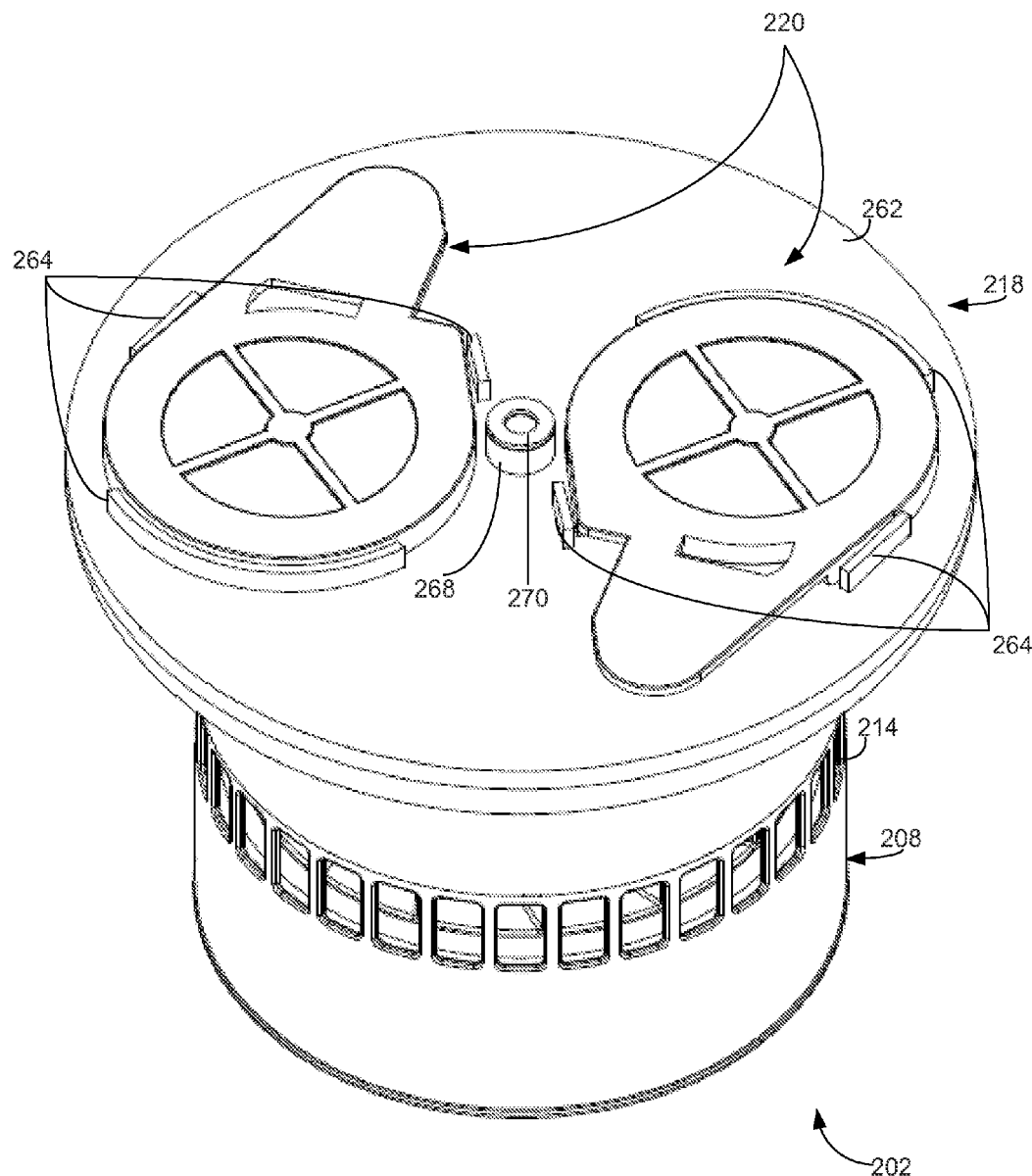
FIG. 12 is a top and side perspective view of the portable area repellent device of FIG. 9 with a top cover removed.

Turning now to FIG. 12, the portable area repellent device 202 is shown with the top housing cover 206 removed. The two chemical substrates 220 are positioned side-by-side within the two sets of substrate frames 264 that are provided on the substrate support platform 262 of the transitional wall 218. Centrally located on the substrate support platform 262 are the magnet 268 and the washer 270, which together define the hollow channel configured to receive the magnetic rod 294 of the top housing cover 206. (see FIG. 11). The transitional wall 218 is received on the circumferential ring 208 immediately above the plurality of outlet orifices 214.

Moving now to FIGS. 13-16, another embodiment of a portable area repellent device 302 is shown. The alternative device 302 includes a three-piece housing 304 that comprises a top housing cover 306 disposed on a circumferential ring 308 that is further received over a lower housing body 310. The top housing cover 306 provides an inlet orifice 312 for receiving air into the housing 304. The circumferential ring 308 provides a row of outlet orifices 314 for exhausting air out of the housing 304, whereby a plurality of outlet orifices 314 are spaced regularly around 360 degrees of the circumferential ring 308. As shown, the outlet orifices 314 are disposed below and generally transverse to the plane of the inlet orifice 312. Further, a solid cylindrical wall 316 extending below the row of outlet orifices 314 generally conceals the lower housing body 310 disposed within it. In one preferred embodiment, a range of 25 to 35 rectangular-shaped outlet orifices 314 are spaced evenly above the cylindrical wall 316 on the circumferential ring 308. It is noted that other shapes and configurations are possible, including the above-described configuration shown in FIGS. 1-3.

Figure 13:
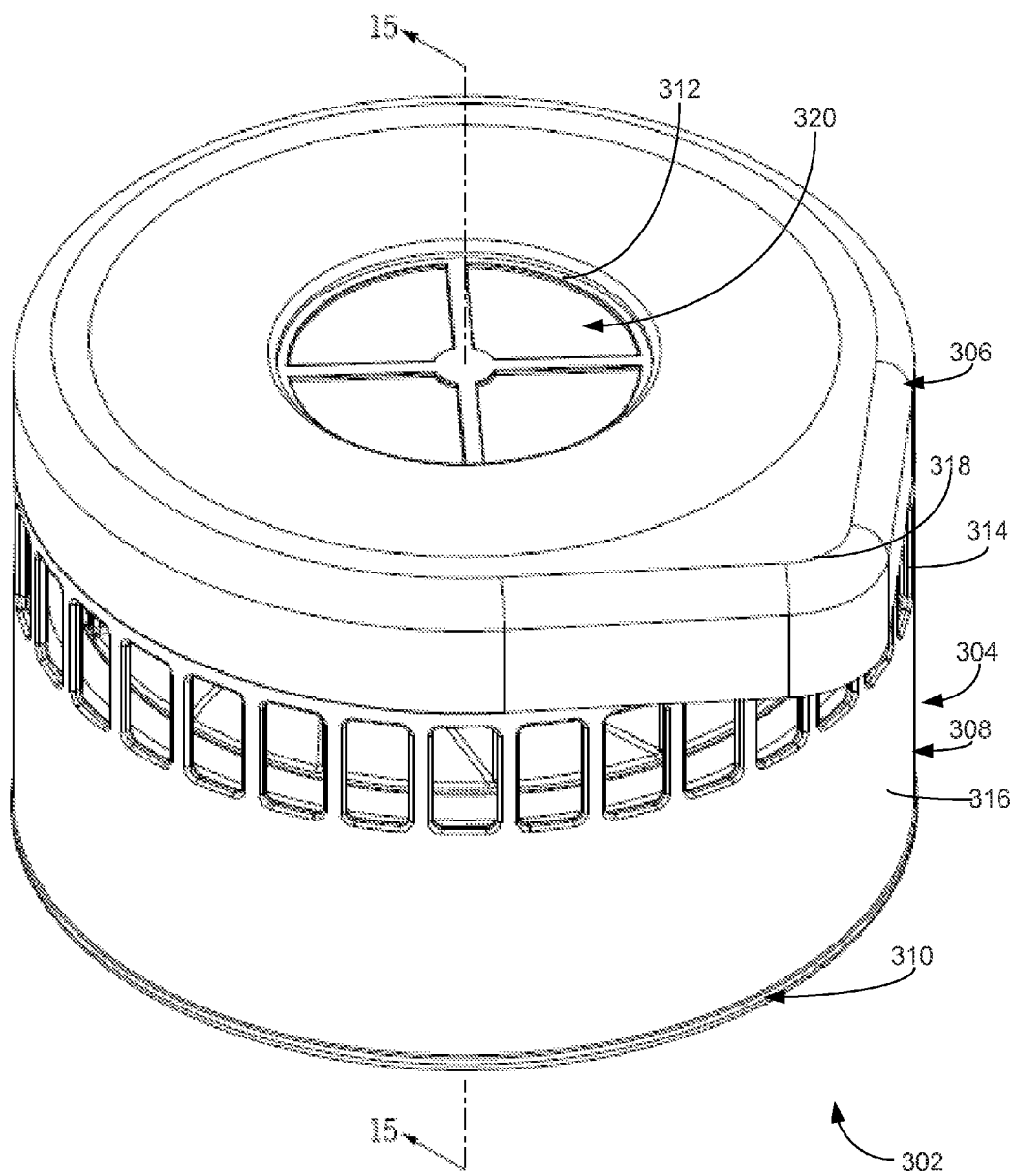
FIG. 13 is a top and side perspective view of a fourth embodiment of the portable area repellent device having two substrates in a stacked configuration according to the invention.

As further shown in FIG. 13, the top housing cover 306 extends to a protruding tab 318 having a generally pointed structure interrupting the otherwise circular profile of the top housing cover 306. The protruding tab 318 may aid in removal of the top housing cover 306 from the circumferential ring 308, which may be secured together according to various methods described in at least FIGS. 1-3. The protruding tab 318 also receives a portion of one of a plurality of chemical substrates 320 secured within the device 302 and exposed through the inlet orifice 312. It is noted that while the inlet orifice 312 is generally a circular aperture as shown in FIG. 13, other shapes and configurations can be contemplated, such as a plurality of inlet orifices 312 and/or grill structures.

Figure 14:
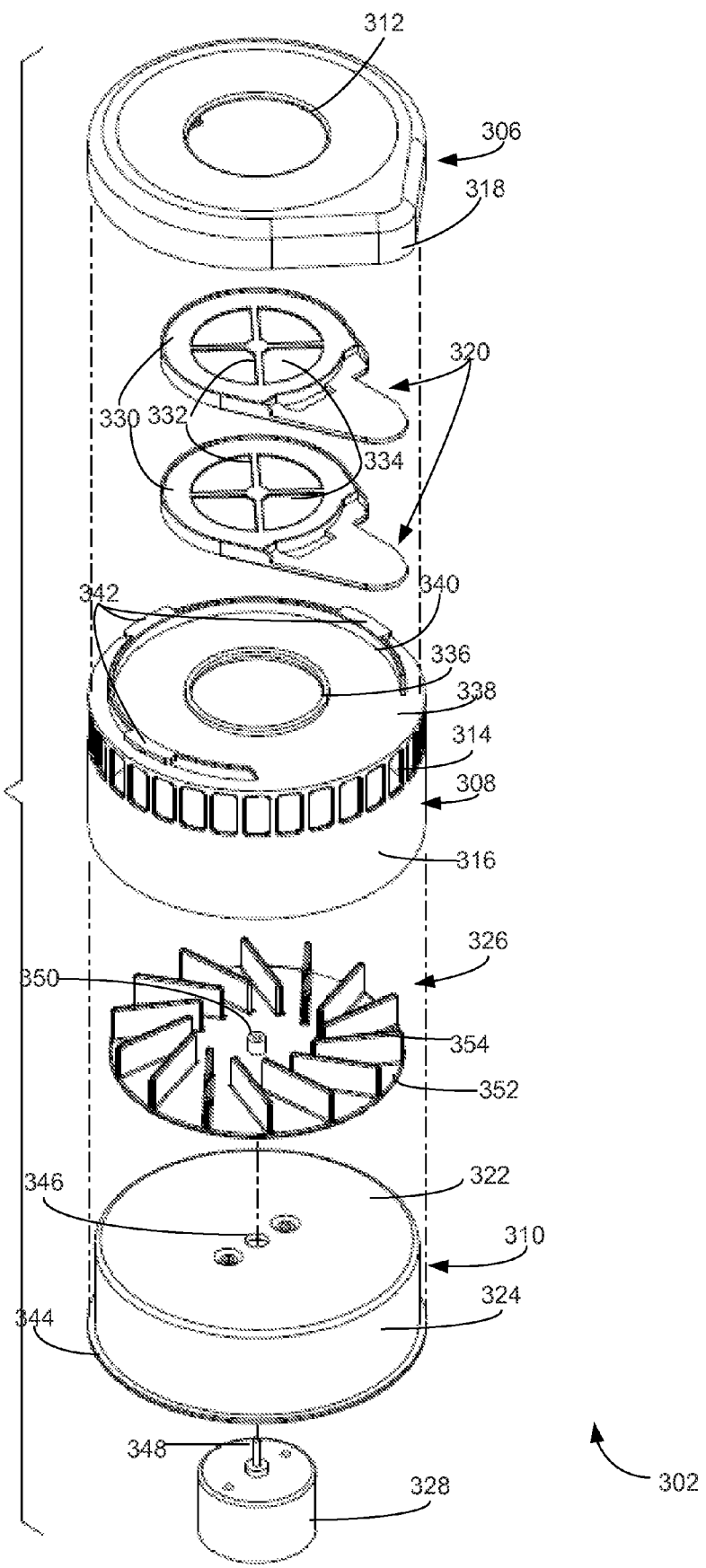
FIG. 14 is an exploded perspective view of the portable area repellent device of FIG. 13.

Turning to FIG. 14, an exploded view of the portable area repellent device 302 of FIG. 13 is provided. The top housing cover 306 which provides the inlet orifice 312 and the protruding tab 318 is received on an upper portion of the circumferential ring 308 and acts as a lid for enclosing the plurality of chemical substrates 320 disposed therein. As shown in a preferred embodiment, two chemical substrates are stacked within the device 302. The circumferential ring 308, which provides the outlet orifices 314 disposed above the cylindrical wall 316, is further slid over the lower housing body 310 as a covering. The lower housing body 310 comprises a fan support platform 322 extending to a hollow cylindrical shell 324, whereby the fan support platform 322 mounts a fan 326 for radial alignment with the row of outlet orifices 314. A motor 328 is secured inside the cylindrical shell 324 from an underside of the fan support platform 322.

In particular, each of the stacked chemical substrates 320 shown in FIG. 14 is a replaceable refill substance that bears an air treatment chemical, such as one or more of the actives described previously. Each chemical substrate 320 may include one or more aspects of the chemical substrates 120, 220 as described above. In the embodiment as shown, each of the two chemical substrates 320 has a generally slab-like support structure 330 that is essentially tear-drop shaped with a circular portion at one end and a triangular portion at another end. The triangular portion may be particularly arranged to engage the protruding tab 318 of the top housing cover 306 when assembled. Each support structure 330 has a circular opening with a spoke support 332 spanning across it, which may aid in positioning a fabric substrate 334 that bears the air treatment chemical. When air is drawn in through the inlet orifice 312, the air passes through the fabric substrate 334 portion of each chemical substrate 320 and a volume of the air treatment chemical mixes with the moving air. The moving air continues to be drawn through a substrate opening 336 on a substrate support platform 338 provided on the circumferential ring 308.

Looking at the substrate support platform 338 of FIG. 14, the substrate opening 336 is shown as circular and approximately the same size as the circular opening of the support structure 330 on the chemical substrate 320. Further the substrate opening 336 provides a raised lip which may engage a corresponding underside portion of the lower chemical substrate 320 to secure the substrate 320 onto the circumferential ring 308 in proper axial alignment. Notably, other sizes and shapes may form the substrate opening 336, which may match any of a variety of shapes formed with the construction of the chemical substrate 320. The circumferential ring 308 further provides a twist-lock spine 340 disposed between the substrate opening 336 and the edge of the substrate support platform 338. The twist-lock spine 340 forms a protruding ridge with a plurality of locking tabs 342 that engage a plurality of corresponding locking notches provided on the underside of the top housing cover 306. In the preferred embodiment shown in FIG. 14, three locking tabs 342 are provided, although any number of locking tabs 342 may be contemplated. When the top housing cover 306 is placed flush against the circumferential ring 308, a brief twist of the top housing cover 306, such as a clockwise quarter-turn, can engage the locking tabs 342 in the cover 306. An anti-clockwise turn can unlock the locking tabs 342 to remove the cover 306.

FIG. 14 further shows the lower housing body 310 having a circular rim 344 that extends radially around a base of the cylindrical shell 324. In assembly, the circular rim 344 abuts a bottom edge of the circumferential ring 308 and may further utilize various locking mechanisms to secure the ring 308 and rim 344 together. On the upper end of the lower housing body 310, a central opening 346 is provided through the fan support platform 322 for insertion of a shaft 348 of the motor 328 from beneath the platform 322. The shaft 348 operatively engages the fan 326 at a tubular mounting element 350 disposed on a rotor 352 of the fan 326. As shown in FIG. 14, the fan 326 may comprise a plurality of flat rectangular blades 354 that are angled opposite to the direction of rotation of the fan 326. In another aspect, the blades 354 may be angled into the direction of rotation of the fan 326. It is contemplated that the fan 326 may include any of the aspects of the fan 34 that is described in FIGS. 4-5.

Figure 15:
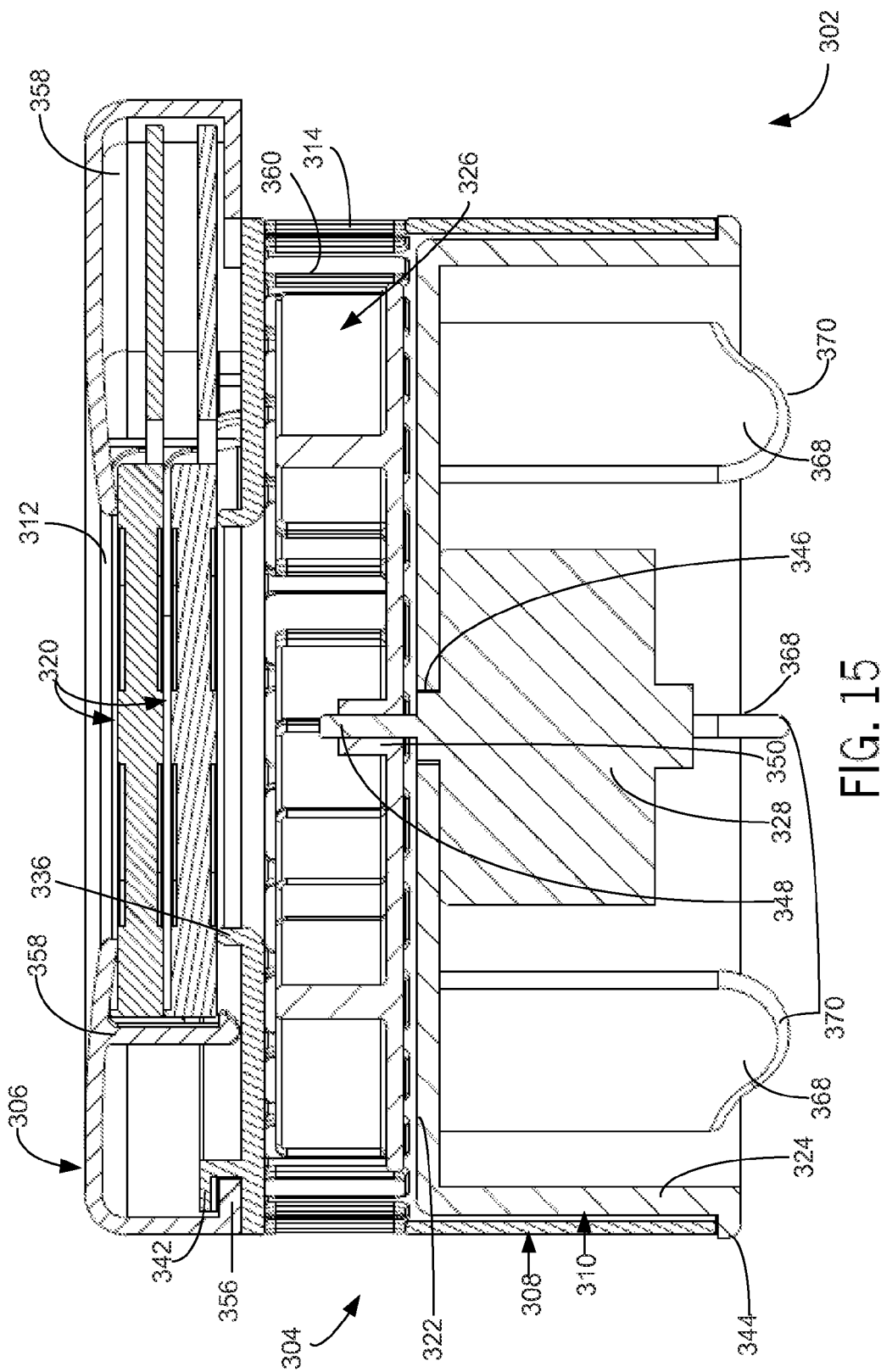
FIG. 15 is a cross-sectional view taken along line 15-15 of FIG. 13.

Referring now to FIG. 15, a cross-section of the device 302 taken along line 15-15 of FIG. 13 is shown. The assembled three piece housing 304 includes the top housing cover 306 disposed on the circumferential ring 308, which is further disposed on the lower housing body 310 that extends to the circular rim 344. As shown, the top housing cover 306 is twist-lock secured to the circumferential ring 308 by engaging the locking tab 342 of the ring 308 with a corresponding locking element 356 on the cover 306. The lower of the two stacked chemical substrates 320 rests on the substrate opening 336 and is further received within one or more slots 358 provided on the underside of the top housing cover 306. In an aspect, the slot 358 or plurality of slots 358 for engaging various portions of the chemical substrate 320, such as the circular portion and the triangular portion, are engaged when the top housing cover 306 is twist-locked onto the circumferential ring 308. When air passes through the inlet orifice 312 of top housing cover 306 and past the chemical substrate 320, the air mixes with the air treatment chemical and is further delivered through the substrate opening 336 toward the fan 326. The fan 326 is provided within an interior space 360 of the circumferential ring 308, which is radially aligned with the row of outlet orifices 314 on the ring 308. During operation, the fan 326 radially redirects the flow of mixed air out through the outlet orifices 314.

Further shown in FIG. 15, a top surface of the motor 328 abuts the underside of the fan support platform 322. The shaft 348 of the motor extends through the central opening 346 and is further friction-fitted or otherwise secured within the tubular mounting element 350 of the fan 326. One or more supporting legs 368 may be distributed within the cylindrical shell 324 around the motor 328 and configured to engage a resting surface such as a table-top. In a preferred embodiment as shown, six supporting legs 368 are regularly spaced within the cylindrical shell 324, with a vertical side of each supporting leg 368 in connection with the cylindrical shell 324 and a horizontal top portion of the each supporting leg 368 in contact with the underside of the fan support platform 322. The supporting legs 368 may be constructed of the same material and/or mold as the lower housing body 310, and may further provide textured and/or rubberized grips on a base surface 370 of each leg 368 in order to enhance friction between the device 302 and a resting surface, thereby preventing slippage or other inadvertent motion of the device 302. In another aspect, the lower housing body 310 may be configured to secure a power supply and/or control unit (not shown) for connection to the motor 328. For instance, the power supply may comprise one or more batteries placed adjacent to the underside of the motor 328 with one or more battery contacts that deliver power to the motor 328.

Figure 16:
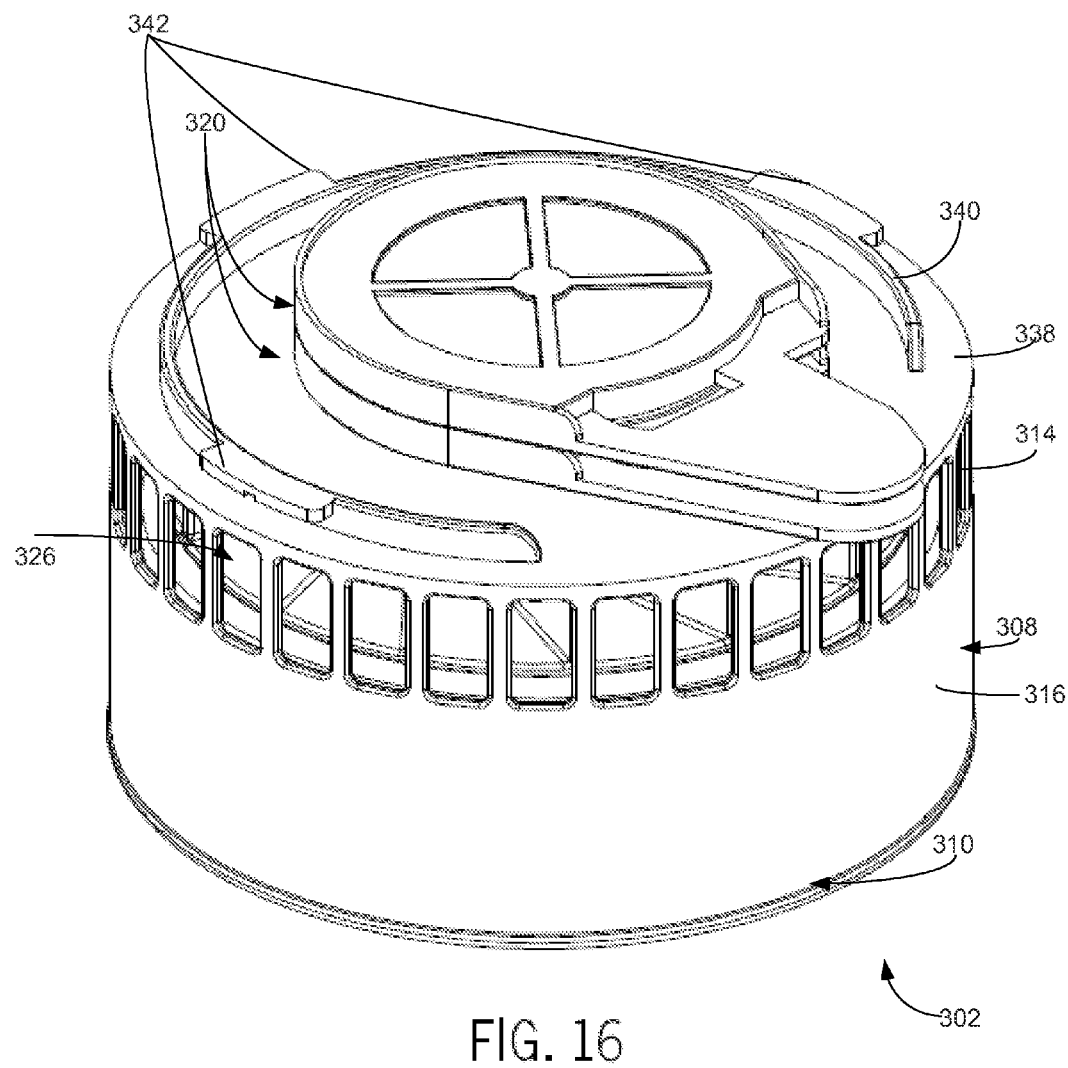
FIG. 16 is a top and side perspective view of the portable area repellent device of FIG. 13 with a top cover removed.

Turning now to FIG. 16, the portable area repellent device 302 is shown with the top housing cover 306 removed. The two chemical substrates 320 are positioned in a stacked configuration on the substrate support platform 338 of the circumferential ring 308. It is contemplated that any number of chemical substrates 320 may be stacked in the device 302. Surrounding the chemical substrates 320 is the twist-lock spine 340 having three locking tabs 342 spaced thereon. A plurality of outlet orifices 314 are provided on the circumferential ring 308 above the cylindrical wall 316 of the ring 308. The fan 326 is mounted on the lower housing body 310 that is generally hidden behind the cylindrical wall 316. The lower housing body 310 elevates the fan 326 such that it is radially aligned with the plurality of outlet orifices 314 where the air mixture is directed through.

Figure 17:
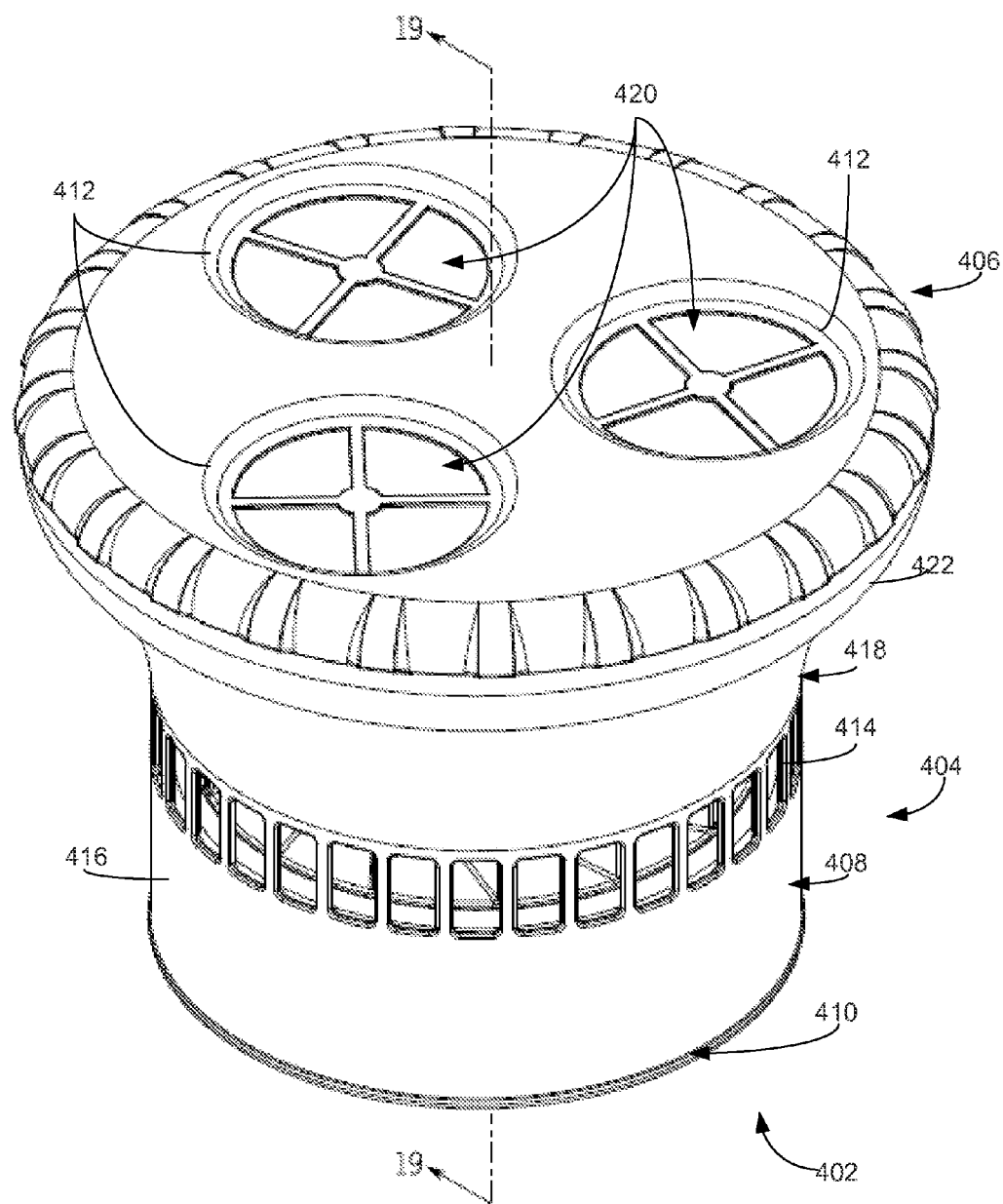
FIG. 17 is a top and side perspective view of a fifth embodiment of the portable area repellent device having three substrates in a side-by-side configuration according to the invention.

FIGS. 17-20 show yet another embodiment of a portable area repellent device 402. As shown in FIG. 17, the device 402 comprises a four-piece housing 404 having a top housing cover 406 and a circumferential ring 408 disposed over a lower housing body 410. A set of three inlet orifices 412 extend through the top housing cover 406 and a row of outlet orifices 414 is provided immediately above a solid cylindrical wall 416 on the circumferential ring 408. The four-piece housing 404 further comprises a transitional wall 418 that retains the three chemical substrates 420 thereon. Together, the top housing cover 406, the circumferential ring 408, the lower housing body 410, and the transitional wall 418 form the four-piece housing 404.

Figure 18:
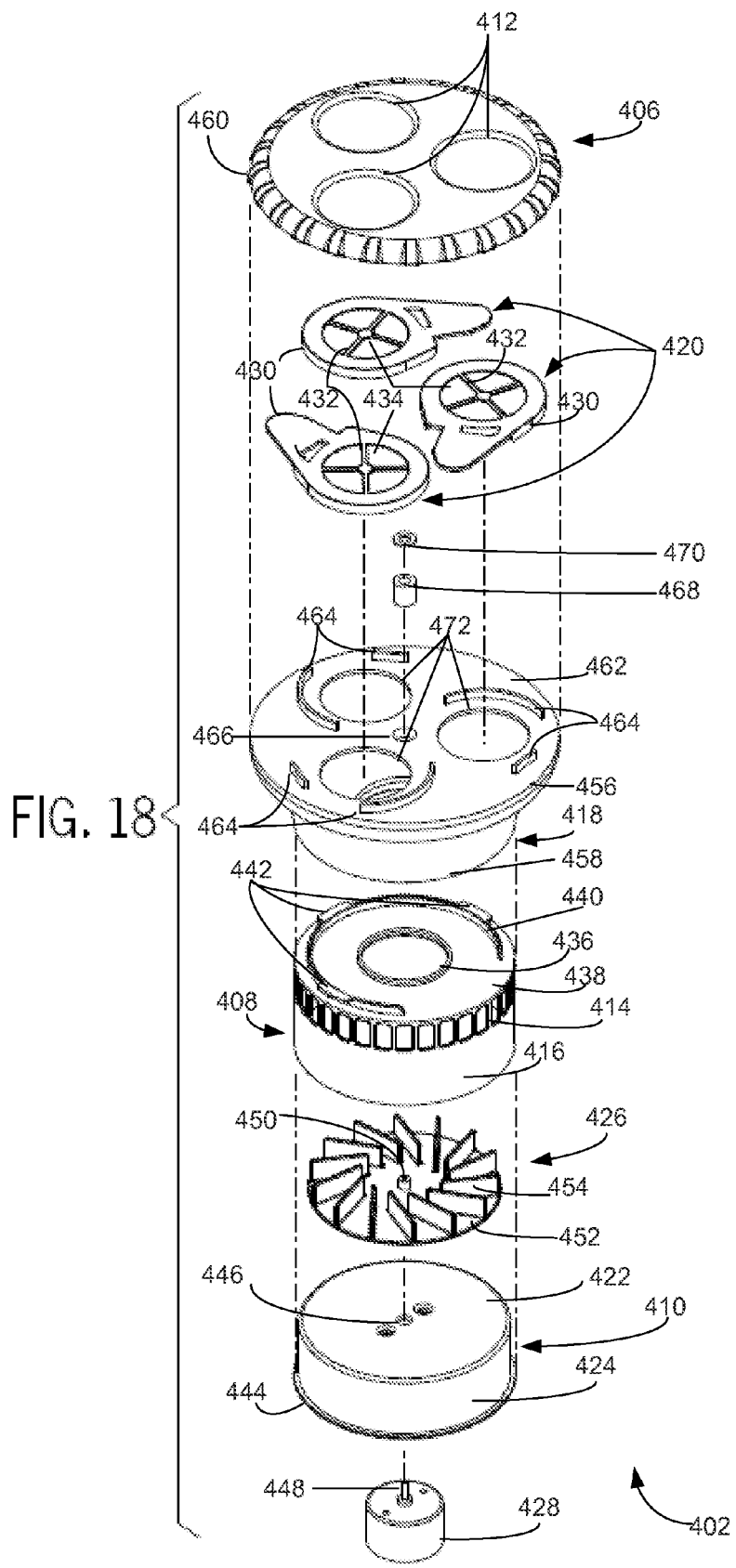
FIG. 18 is an exploded view of the portable area repellent device of FIG. 17.

Turning to FIG. 18, an exploded view of the portable area repellent device 402 of FIG. 17 is provided. The top housing cover 406 which provides the three inlet orifices 412 in a side-by-side configuration is received on an upper portion of the transitional wall 418 and acts as a lid for enclosing the three chemical substrates 420 disposed side-by-side therein. The transitional wall 418 is further received on an upper portion of the circumferential ring 408, which provides the outlet orifices 414 disposed above the cylindrical wall 416. The circumferential ring 408 is further slid over the lower housing body 410 as a covering. The lower housing body 410 comprises a fan support platform 422 extending to a hollow cylindrical shell 424, whereby the fan support platform 422 mounts a fan 426 for radial alignment with the row of outlet orifices 414. A motor 428 is secured inside the cylindrical shell 424 from an underside of the fan support platform 422.

Each of the three chemical substrates 420 shown in FIG. 18 is a replaceable refill substance that bears an air treatment chemical, such as one or more of the actives described previously. In a particular embodiment as shown, the chemical substrate 420 is similar to the previously described chemical substrates 120, 220, 320 and comprises a slab-like support structure 430. The support structure 430 has a circular opening with a spoke support 432 spanning across it, which may aid in positioning a fabric substrate 434 that bears the air treatment chemical. When air is drawn in through the pair of inlet orifices 412, the air passes through the fabric substrates 434 portion of the chemical substrate 420 and a volume of the air treatment chemical mixes with the moving air. The moving air continues to be drawn through a substrate opening 436 on a substrate support platform 438 provided on the circumferential ring 408.

Looking at the substrate support platform 438 of FIG. 18, the substrate opening 436 is shown as circular and approximately the same size as the circular opening of the support structure 430 on each of the chemical substrates 420. Further, the substrate opening 436 provides a raised lip which, in some embodiments such as in FIG. 18, may be configured to engage a corresponding underside portion of an additional chemical substrate 420 to secure such additional substrates 420 onto the circumferential ring 408 in proper axial alignment. Notably, other sizes and shapes may form the substrate opening 436. The circumferential ring 408 further provides a twist-lock spine 440 disposed between the substrate opening 436 and the edge of the substrate support platform 438. The twist-lock spine 440 forms a protruding ridge with a plurality of locking tabs 442 that engage a plurality of corresponding locking notches provided on the underside of the top housing cover 406. In the preferred embodiment shown in FIG. 18, three locking tabs 442 are provided, although any number of locking tabs 442 may be contemplated. When the transitional wall 418 is placed flush against the circumferential ring 408, a brief twist of the transitional wall 418, such as a clockwise quarter-turn, can engage the locking tabs 442 in the wall 418. It is contemplated that the transitional wall 418 and any of the previously described top housing covers and transitional walls can be interchangeably received by this same twist-lock mechanism.

FIG. 18 further shows the lower housing body 410 having a circular rim 444 that extends radially around a base of the cylindrical shell 424. In assembly, the circular rim 444 abuts a bottom edge of the circumferential ring 408 and may further utilize various locking mechanisms to secure the ring 408 and rim 444 together. On the upper end of the lower housing body 410, a central opening 446 is provided through the fan support platform 422 for insertion of a shaft 448 of the motor 428 from beneath the platform 422. The shaft 448 operatively engages the fan 426 at a tubular mounting element 450 disposed on a rotor 452 of the fan 426. As shown in FIG. 18, the fan 426 may comprise a plurality of flat rectangular blades 454 that are angled opposite to the direction of rotation of the fan 426. In another aspect, the blades 454 may be angled into the direction of rotation of the fan 426. It is contemplated that the fan 426 may include any of the aspects of the fan 34 that is described in FIGS. 4-5.

Still referring to FIG. 18, the transitional wall 418 features a flared end 456 on which the pair of chemical substrates 420 are disposed for alignment with the pair of inlet orifices 412 of the top housing cover 406. The top housing cover 406 is received at the flared end 456 of the transitional wall 418, while the circumferential ring 408 is received at a lower end 458 of the wall 418, proximate the outlet orifices 414. Further, a grooved edge 460 spans at least a portion of the edge of the cover 406. The grooved edge 460 provides the user with a gripping surface to allow easy maneuvering of the top housing cover 406, for instance in attaching or removing the cover 406 from the device 402 and in turning the cover to align the three inlet orifices 412 with the three chemical substrates 420 disposed below it. The chemical substrates 420 are placed on a substrate support platform 462 spanning across the flared end 456 of the transitional wall 418. In particular, a set of substrate frames 464 is provided on the substrate support platform 462 for positioning and securing each chemical substrate 420. The substrate frames 464 may comprise various upstanding physical structures configured to engage edges or underside portions of each chemical substrate 420, such as the circular portion of each substrate as preferred in FIG. 18.

The substrate support platform 462 further provides a pocket 466 disposed centrally on the platform 462 and extending below the platform 462. The pocket 466 is configured to receive a magnet 468 which is provided with a hollow, tubular center for receiving a protruding magnetic element that is disposed on an underside of the top housing cover 406. (see FIG. 19). One or more washers 470 may be provided in axial alignment with the magnet 468. It is contemplated that the magnetic securing mechanism allows for easy maneuvering of the top housing cover 406 while securing it onto the transitional wall 418. However, other securing mechanisms can be contemplated as well, such as a threaded screw disposed on the underside of the top housing cover 406 that may be received in a correspondingly threaded channel, which may be represented by the magnet 468. Further disposed on the substrate support platform 462 is a pair of platform orifices 472 that allow the moving air and chemical treatment mixture to flow through the transitional wall 418 and continue through the substrate opening 436 provided on the upper end of the circumferential ring 408, as described in the preceding paragraphs.

Figure 19:
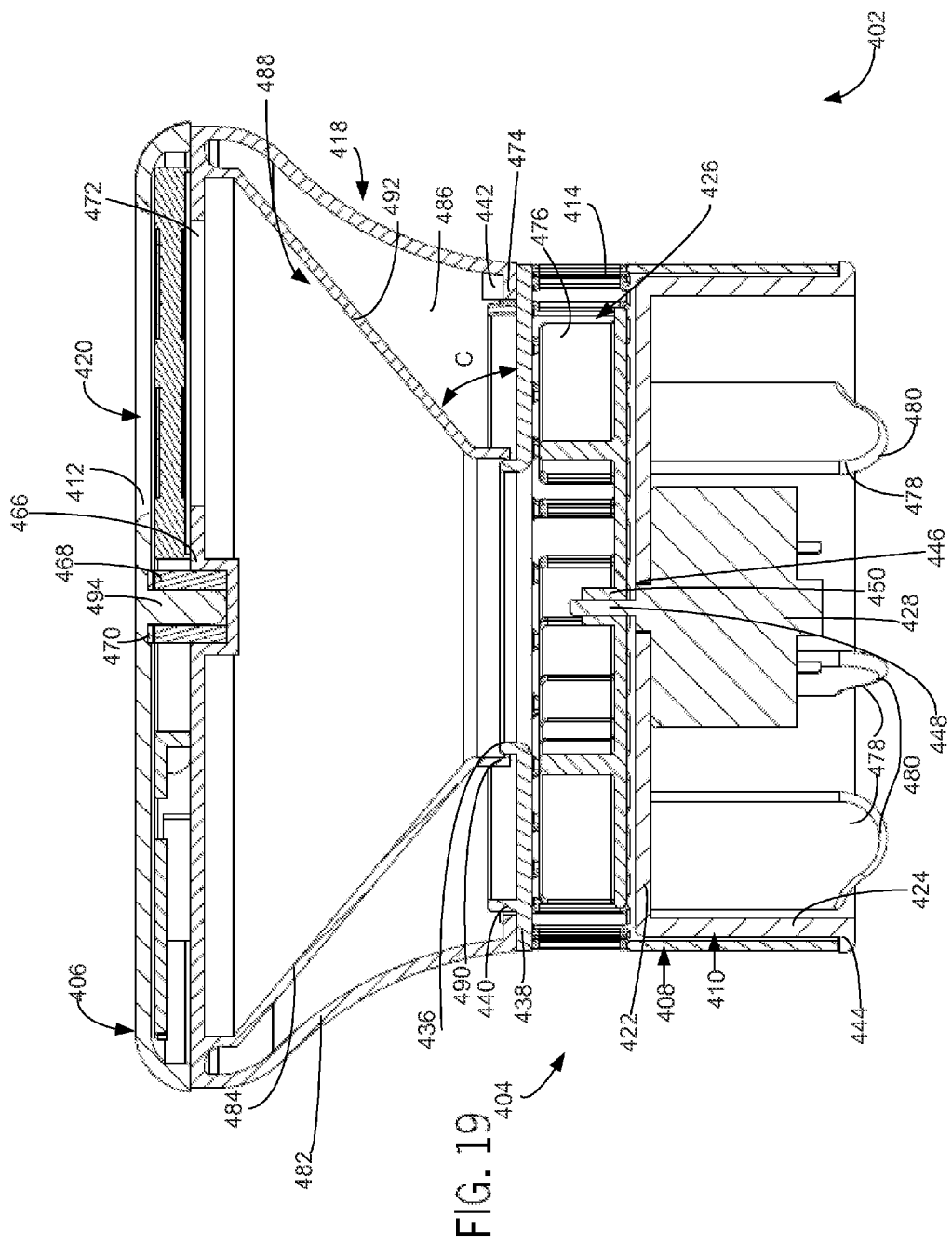
FIG. 19 is a cross-sectional view taken along line 19-19 of FIG. 17.

Referring now to FIG. 19, a cross-section of the device 402 taken along line 19-19 of FIG. 17 is shown. The assembled four-piece housing 404 includes the top housing cover 406 disposed on the transitional wall 418, which is further connected to the circumferential ring 408 that is received over the lower housing body 410. The top housing cover 406 provides three side-by-side inlet orifices 412, while the plurality of outlet orifices 414 are arranged immediately above the cylindrical wall 416 of the circumferential ring 408. Aligned with the three inlet orifices 412 are the three chemical substrates 420 that span across the three platform orifices 472 provided on the transitional wall 418. The transitional wall 418 is twist-lock secured to the circumferential ring 408 by engaging the locking tab 442 on the ring 408 with a corresponding locking element 474 disposed on the wall 418. As shown, the locking element 474 is a horizontally oriented tab extending from the wall 418 to engage an underside portion of the locking tab 442 disposed on the twist-lock spine 440. When air passes through the inlet orifices 412 of the top housing cover 406 and past the chemical substrates 420, the air mixes with the air treatment chemical and is further delivered through the transitional wall 418 toward the substrate opening 436. The mixed air is continued to be drawn through the substrate open 436 by the fan 426. The fan 426 is provided within an interior space 476 of the circumferential ring 408, which is radially aligned with the row of outlet orifices 414 on the ring 408. During operation, the fan 426 radially redirects the flow of mixed air out through the outlet orifices 414.

Further shown in FIG. 19, a top surface of the motor 428 abuts the underside of the fan support platform 422. The shaft 448 of the motor 428 extends through the central opening 446 and is further friction-fitted or otherwise secured within the tubular mounting element 450 of the fan 426. One or more supporting legs 478 may be distributed within the cylindrical shell 424 around the motor 428 and configured to engage a resting surface such as a table-top. In a preferred embodiment as shown, six supporting legs 478 are regularly spaced within the cylindrical shell 424, with a vertical side of each supporting leg 478 in connection with the cylindrical shell 424 and a horizontal top portion of the each supporting leg 478 in contact with the underside of the fan support platform 422. The supporting legs 478 may be constructed of the same material and/or mold as the lower housing body 410, and may further provide textured and/or rubberized grips on a base surface 480 of each leg 478 in order to enhance friction between the device 402 and a resting surface, thereby preventing slippage of the device 402. In another aspect, the lower housing body 410 may be configured to secure a power supply and/or control unit (not shown) for connection to the motor 428. For instance, the power supply may comprise one or more batteries placed adjacent to the underside of the motor 428 with one or more battery contacts that deliver power to the motor 428.

As shown in FIG. 19, the transitional wall 418 is a double-layer wall that comprises an outer layer 482 that extends to an inner layer 484 and defines a cavity 486 therebetween. It is contemplated that the cavity 486 is not subjected to any airflow. Rather, it may be provided to fluidly taper the general shape of the device 402 from the larger diameter of the top housing cover 406 to the smaller diameter defined by the circumferential ring 408. In addition, the outer layer 482 extends to the locking element 474, or plurality thereof, that is configured to twist-lock engage to the circumferential ring 408. The inner layer 484 is angled in the shape of a funnel 488 toward a spout 490 to provide an angled airflow pathway for the air mixture entering through the platform orifices 472 and converging in the spout 490. As shown in FIG. 19, the spout 490 comprises a short cylindrical wall that receives the substrate opening 436 of the circumferential ring 408 such that the air mixture is drawn further into the fan 426. It is contemplated that an airtight or otherwise snug fit between the spout 490 and the substrate opening 436 prevents significant loss of airflow, for instance into the surrounding cavity 486. In a particular aspect, the inner layer 484 defines an inclined surface 492 that is directed at an angle C above a horizontal plane defined by the substrate support platform 438. The angle C is preferred to be about a 30 degree angle to about a 60 degree angle uniformly around the funnel 488. As such, the funnel 488 provides a converging airflow path by defining an angled flow pathway that flares from a lower end of the transitional wall 418 proximate to the outlet toward an upper end of the transitional wall 418 proximate to the inlet of the device 402.

As further shown in FIG. 19, the top housing cover 406 is secured to the transitional wall 418 by the magnetic interaction between a magnetic rod 494 provided on the underside of the cover 406 and the magnet 468 that is provided within the pocket 466 of the transitional wall 418. The washer 470 is disposed between the magnetic rod 494 and the magnet 468, and can be permanently attached to either the rod 494 or the magnet 468. It is contemplated that other portions of the top housing cover 406 can comprise magnetic properties for interaction with corresponding magnetic elements provided on the transitional wall 418.

Figure 20:
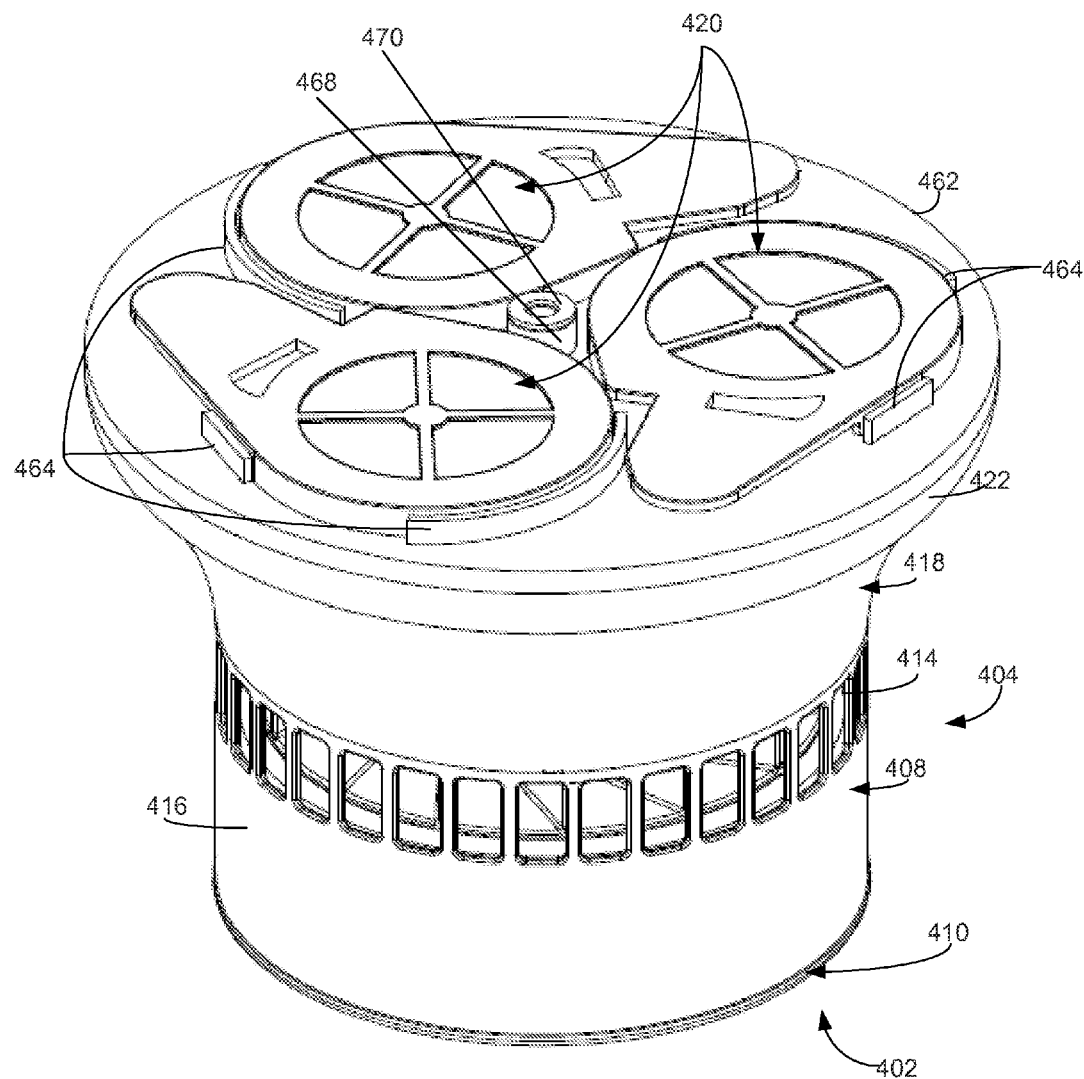
FIG. 20 is a top and side perspective view of the portable area repellent device of FIG. 17 with a top cover removed.

Turning now to FIG. 20, the portable area repellent device 402 is shown with the top housing cover 406 removed. The three chemical substrates 420 are positioned side-by-side within the three sets of substrate frames 464 that are provided on the substrate support platform 462 of the transitional wall 418. Centrally located on the substrate support platform 462 are the magnet 468 and the washer 470, which together define the hollow channel configured to receive the magnetic rod 494 of the top housing cover 406. (see FIG. 19). The transitional wall 418 is received on the circumferential ring 408 immediately above the plurality of outlet orifices 414.

INDUSTRIAL APPLICABILITY

The dispensing device disclosed herein can be configured to operate in one or more embodiments and combinations thereof to provide an improved user experience having various options for dispensing volatile materials according to various user needs.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications that come within the scope of the appended claims are reserved.

All documents cited in the Detailed Description of the Invention are, in relevant part, incorporated herein by reference; the citation of any document is not to be construed as an admission that it is prior art with respect to the present invention.

We claim:

1. A device for dispensing an air treatment chemical, the device comprising:
    a housing including an inlet for permitting air to enter into an interior space of the housing and including an outlet for permitting air mixed with air treatment chemical to exit the interior space;
    a substrate positioned within the housing, the substrate bearing an air treatment chemical;
    a power supply mounted within the housing;
    a motor mounted within the housing, the motor being powered by the power supply; and a fan mounted within the housing and connected to the motor, the fan being capable of moving air from the inlet adjacent the substrate so as to mix air treatment chemical into the moving air, and then deliver a mixture of air and air treatment chemical through the outlet to outside of the housing, wherein the outlet of the housing comprises a circumferential ring defined by a plurality of apertures spaced apart by a plurality of strips, the plurality of apertures providing a combined aperture area A and the plurality of strips providing a combined strip surface area S, further wherein a penetration ratio P of the circumferential ring is defined by $P=A/(A+S)$, and wherein the penetration ratio P is about 0.75 or less.

2. The device of claim 1, wherein a plurality of substrates are positioned in a side-by-side configuration within the housing, each of the plurality of substrates bearing an air treatment chemical.

3. The device of claim 1, wherein a plurality of substrates are positioned in a stacked configuration within the housing, each of the plurality of substrates bearing an air treatment chemical.

4. The device of claim 1, wherein two or three substrates are positioned within the housing, each of the two or three substrates bearing an air treatment chemical.

5. The device of claim 1, wherein the outlet is provided below the inlet of the housing.

6. The device of claim 1, wherein the fan is configured to divert the air mixture in a radial direction through the interior space of the housing and through the outlet to the outside of the housing.

7. The device of claim 1, wherein the fan includes a plurality of flat blades sloped opposite to the direction of rotation of the fan.

8. The device of claim 1, wherein the inlet of the housing comprises at least one inlet aperture defining a plane transverse to an axis of rotation of the fan.

9. The device of claim 8, wherein the housing includes a removable housing cover comprising the inlet and a housing body defined by a housing wall extending upward from a base of the housing body, wherein the housing wall comprises the outlet, further wherein the removable housing cover secures to the housing body with a twist-lock interaction.

10. The device of claim 1, wherein the air treatment chemical is a pest control active ingredient.

11. The device of claim 1, wherein the penetration ratio P is about 0.50 or less.

12. The device of claim 1, wherein the surface area of each of the plurality of strips on the circumferential ring is about uniform.

* * * * *